US009109560B2

(12) United States Patent
Hishinuma et al.

(10) Patent No.: US 9,109,560 B2
(45) Date of Patent: Aug. 18, 2015

(54) HIGH PRESSURE PUMP

(75) Inventors: Osamu Hishinuma, Toyota (JP); Teppei Matsumoto, Obu (JP); Yuichi Irino, Tokyo (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 792 days.

(21) Appl. No.: 13/360,455

(22) Filed: Jan. 27, 2012

(65) Prior Publication Data

US 2012/0195779 A1 Aug. 2, 2012

(30) Foreign Application Priority Data

Jan. 27, 2011 (JP) .................................. 2011-15644
Aug. 29, 2011 (JP) ................................ 2011-186135

(51) Int. Cl.

*F16J 15/08* (2006.01)
*F16J 10/00* (2006.01)
*F02M 59/10* (2006.01)
*F02M 59/48* (2006.01)
*F04B 1/04* (2006.01)

(52) U.S. Cl.

CPC ............. *F02M 59/102* (2013.01); *F02M 59/48* (2013.01); *F04B 1/0408* (2013.01)

(58) Field of Classification Search

CPC ............................. F02M 59/48; F02M 59/102
USPC .................... 92/168, 169.1, 72, 129; 417/470
See application file for complete search history.

(56) References Cited

U.S. PATENT DOCUMENTS

| | | | | |
|---|---|---|---|---|
| 5,174,734 | A | 12/1992 | Thomas et al. | |
| 7,604,462 | B2 | 10/2009 | Inoue | |
| 7,635,257 | B2 | 12/2009 | Inoue | |
| 8,052,404 | B2 | 11/2011 | Inoue | |
| 8,052,405 | B2 | 11/2011 | Inoue | |
| 2010/0047086 | A1* | 2/2010 | Suzuki et al. | 417/307 |
| 2010/0074783 | A1* | 3/2010 | Inoue | 417/505 |
| 2010/0215529 | A1* | 8/2010 | Inoue | 417/540 |

FOREIGN PATENT DOCUMENTS

JP 2008-525713 7/2008

OTHER PUBLICATIONS

Office Action (5 pages) dated Jan. 8, 2014, issued in corresponding Chinese Application No. 201210023092.6 and English translation (4 pages).
Office Action (3 pages) dated Feb. 26, 2013, issued in corresponding Japanese Application No. 2011-186135 and English translation (4 pages).

* cited by examiner

*Primary Examiner* — Edward Look
*Assistant Examiner* — Daniel Collins
(74) *Attorney, Agent, or Firm* — Nixon & Vanderhye P.C.

(57) ABSTRACT

A plunger stopper is installed to a cylinder hole forming portion of a cylinder forming member. The plunger stopper cooperates with a step portion of a plunger to limit movement of the plunger in a state where a slide surface of the plunger contacts an inner peripheral wall surface of the cylinder hole.

13 Claims, 16 Drawing Sheets

HIGH PRESSURE PUMP

CROSS REFERENCE TO RELATED APPLICATION

This application is based on and incorporates herein by reference Japanese Patent Application No. 2011-15644 filed on Jan. 27, 2011 and Japanese Patent Application No. 2011-186135 filed on Aug. 29, 2011.

BACKGROUND OF THE INVENTION

1. Field of the Invention

The present invention relates to a high pressure pump.

2. Description of Related Art

A high pressure pump, which supplies fuel to a fuel supply system of an internal combustion engine, is known. Fuel, which is drawn out of a fuel tank, is supplied into a pressurizing chamber upon downward movement of a plunger in a cylinder hole of the high pressure pump. Then, the fuel is metered and is pressurized in the pressurizing chamber upon upward movement of the plunger in the cylinder hole.

At a process of assembling such a high pressure pump or at a process of installing the assembled high pressure pump to the engine, it is required to limit falling off of the plunger from the cylinder hole.

In a high pressure fuel pump recited in JP2008-525713A or a fuel pump recited in JPH04-231673A (corresponding to U.S. Pat. No. 5,174,734), a countermeasure is taken to limit the falling off of the plunger from the cylinder hole. For example, in the high pressure fuel pump of JP2008-525713A, a step portion of a piston (plunger), which is received in a casing, cooperates with a stopper of a stopper element fixed to the casing.

Furthermore, in the fuel pump of JPH04-231673A (corresponding to U.S. Pat. No. 5,174,734), a range of outward movement of a plunger is limited by a circlip, which is engaged with tongues. In this way, during transportation of the fuel pump or assembling of the fuel pump to the engine, it is possible to limit the falling off of the plunger from the cylinder hole (bore).

However, in the high pressure fuel pump of JP2008-525713A, when the step portion, which is formed between a large diameter portion and a small diameter portion of the piston, contacts the stopper of the stopper element, a portion of an outer peripheral wall surface, i.e., a slide surface of the large diameter portion of the piston, which slides along an inner peripheral wall surface of a piston bush, is exposed from the piston bush.

Therefore, when the step portion of the piston contacts the stopper, the exposed slide surface of the piston may possibly be damaged by hitting with another object to cause deformation of the slide surface of the piston. Furthermore, a foreign object (e.g., debris) may possibly adhere to the exposed slide surface of the piston. In both of these situations, slide malfunction of the piston may possibly occur.

In the fuel pump of JPH04-231673A (corresponding to U.S. Pat. No. 5,174,734), the circlip, which limits the range of the outward movement of the plunger, is placed at a location, which is spaced from a body part that forms the cylinder hole (bore). When the plunger contacts the circlip, a portion of the outer peripheral wall surface of the plunger, which slides along the inner peripheral wall surface of the cylinder hole (bore), is exposed from the cylinder hole (bore).

Therefore, even in the fuel pump of JPH04-231673A (corresponding to U.S. Pat. No. 5,174,734), similar to the high pressure fuel pump of JP2008-525713A, the exposed slide surface of the plunger may possibly be damaged by hitting, or a foreign object (e.g., debris) may possibly adhere to the exposed slide surface of the plunger, so that slide malfunction of the plunger may possibly occur.

Furthermore, in the fuel pump of JPH04-231673A (corresponding to U.S. Pat. No. 5,174,734), a size of the stopper structure, which limits the falling off of the plunger from the cylinder hole, is large. Also, this stopper structure is not formed to implement separation between a fuel range and an engine oil range in a case where the fuel range is provided at the lower end of the plunger although this depends on the intended use of the fuel pump.

SUMMARY OF THE INVENTION

The present invention addresses the above disadvantages.

According to the present invention, there is provided a high pressure pump, which includes a cylinder forming member, a plunger and a plunger stopper. The cylinder forming member includes a cylinder hole, a pressurizing chamber and a cylinder hole forming portion. The pressurizing chamber is communicated with the cylinder hole. The cylinder hole forming portion is configured into a tubular form. The cylinder hole is formed in the cylinder hole forming portion. The cylinder hole forming portion projects on a side opposite from the pressurizing chamber and has a cylinder end, which is opposite from the pressurizing chamber. The plunger includes a slide surface and a step portion. The slide surface is slidable along an inner peripheral wall surface of the cylinder hole. The step portion is formed at a predetermined location of the plunger. When the plunger is reciprocated in the cylinder hole in an axial direction of the cylinder hole, fuel is drawn into and pressurized in the pressurizing chamber. The plunger stopper is installed to the cylinder hole forming portion of the cylinder forming member. The plunger stopper cooperates with the step portion of the plunger to limit movement of the plunger in a state where the slide surface of the plunger contacts an inner peripheral wall surface of the cylinder hole.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

Figure 1:
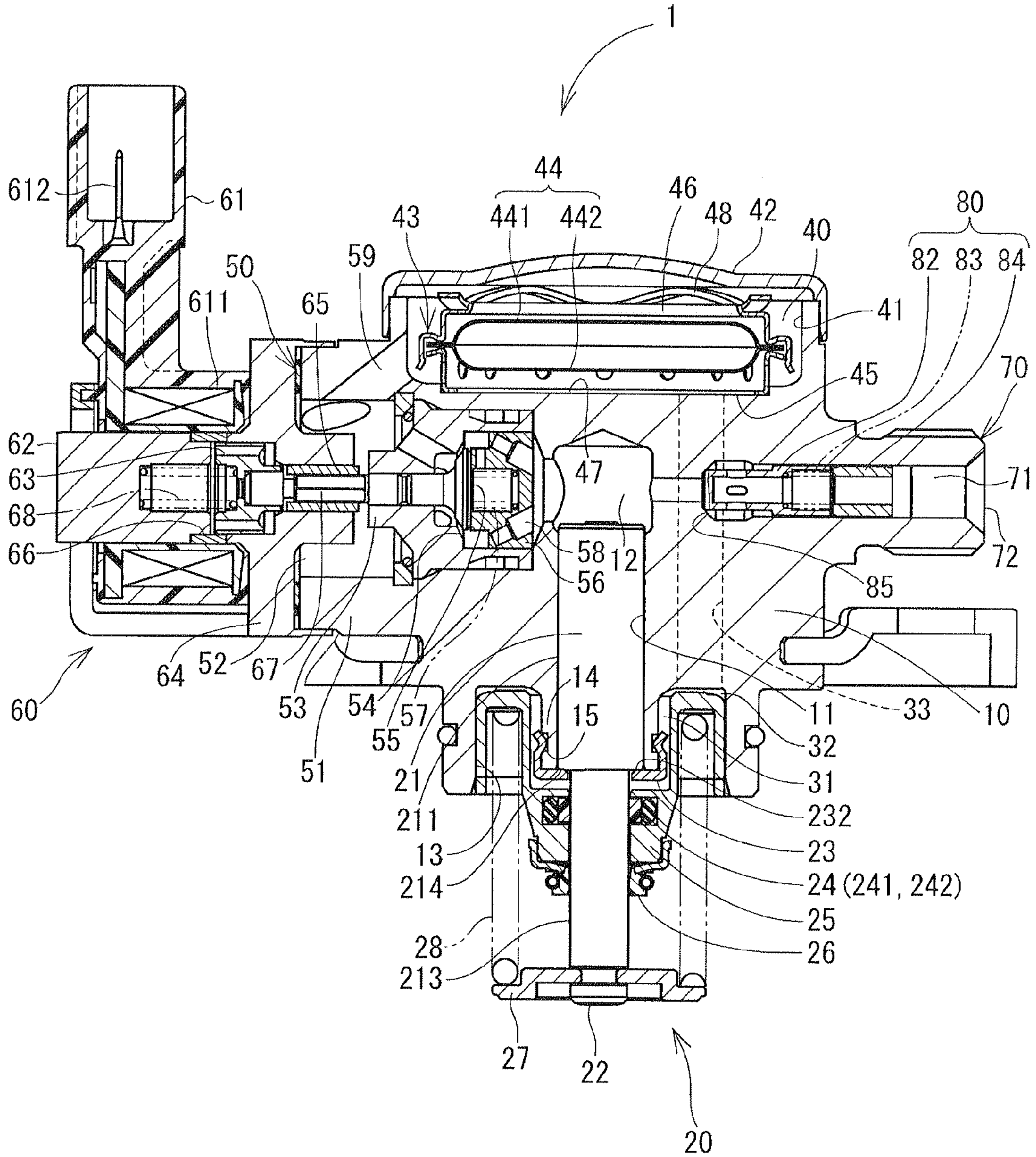
FIG. 1 is a schematic longitudinal cross-sectional view of a high pressure pump according to a first embodiment of the present invention.
Figure 2A:
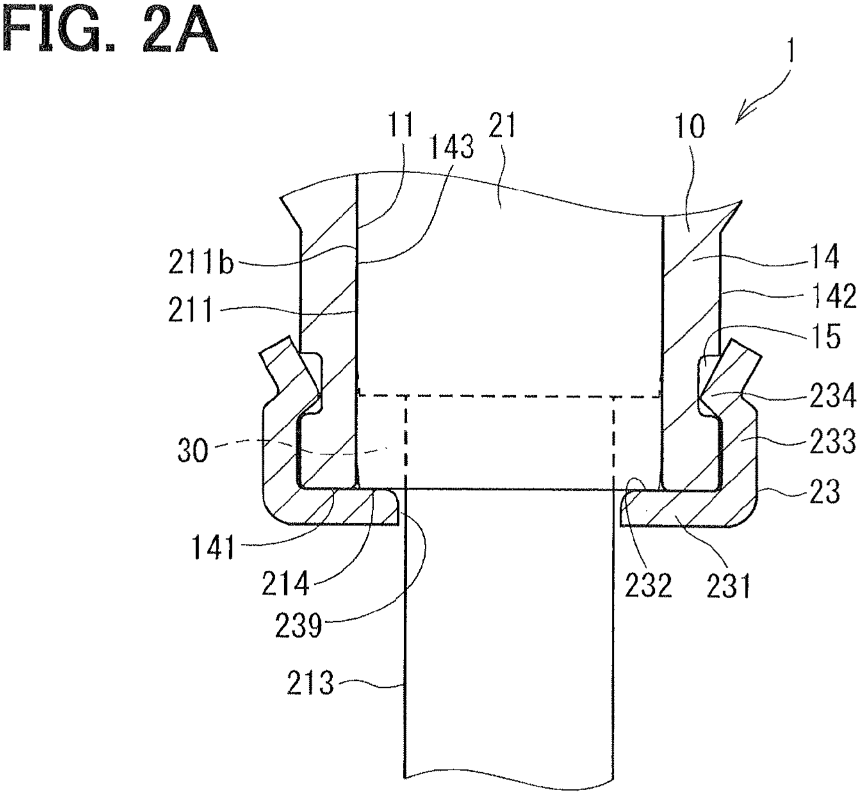
FIG. 2A is a partial cross-sectional view showing a state, in which a plunger stopper is installed to a plunger arrangement of the high pressure pump of FIG. 1.
Figure 2B:
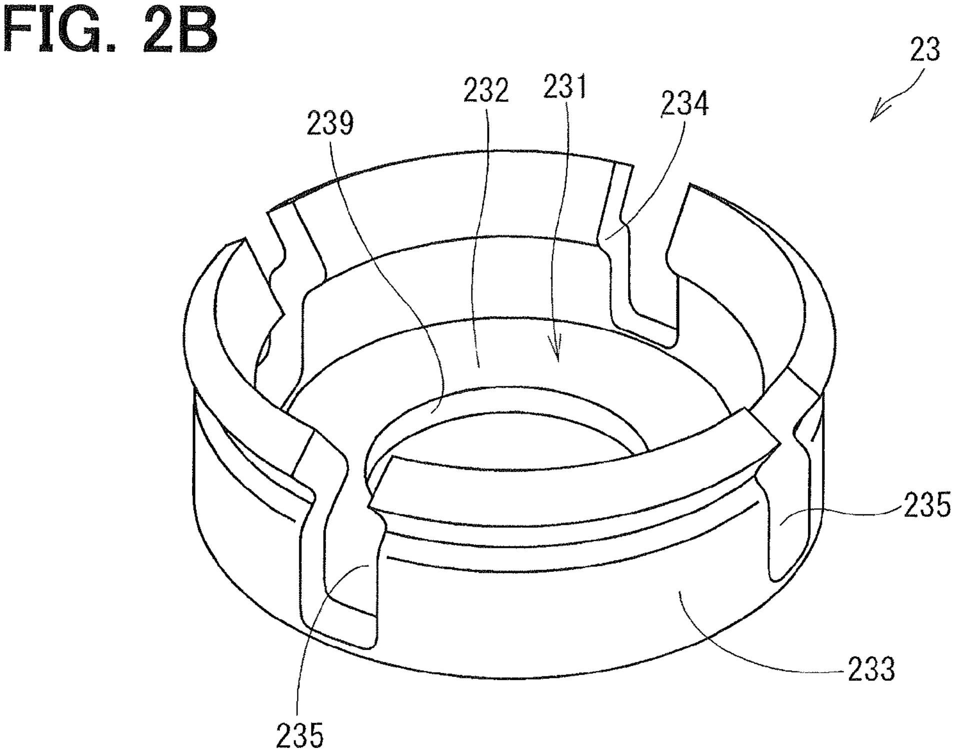
FIG. 2B is a perspective view of the plunger stopper shown in FIG. 2A.

FIG. 1 shows a high pressure pump according to a first embodiment of the present invention. FIG. 2A shows a state, in which a plunger stopper is installed to a plunger arrangement, and FIG. 2B shows the plunger stopper.

The high pressure pump 1 of the present embodiment will be described with reference to FIG. 1.

The high pressure pump 1 is provided in a fuel supply system, which supplies fuel to an internal combustion engine. The fuel, which is drawn from a fuel tank, is pressurized by the high pressure pump 1 and is stored in a delivery pipe. The fuel is injected from each corresponding injector, which is connected to the delivery pipe, into a corresponding cylinder of the internal combustion engine.

The high pressure pump 1 includes a pump body 10, a plunger arrangement 20, a damper chamber 40, an intake valve arrangement 50, an electromagnetic drive arrangement 60 and a discharge valve arrangement 70. In the present embodiment, the pump body 10 forms an outer shell (outer contour) of the high pressure pump 1 and serves as a cylinder forming member (thereby the cylinder forming member being continuously and integrally formed in the pump body 10 in this embodiment).

(a) The pump body 10 and the plunger arrangement 20 will be described.

The pump body 10 has a cylinder hole 11 and a pressurizing chamber 12. The cylinder hole 11 is configured into a cylindrical form. The pressurizing chamber 12 is communicated with the cylinder hole 11. The cylinder hole 11 and the pressurizing chamber 12 are formed integrally. A cylinder hole forming portion 14 is a tubular portion of the pump body 10, which projects from the pump body 10 on a side opposite from the damper chamber 40. The cylinder hole forming portion 14 includes a cylinder end 141, which is opposite from the pressurizing chamber 12. A recess 13, which is configured into an annular form, is formed around the cylinder hole forming portion 14. A portion of a seal element 25, to which a plunger spring 28 is engaged, is received in the recess 13.

An outer recess 15, which is configured into an annular form (annular groove) and extends in a circumferential direction, is formed in an outer peripheral wall surface (outer wall surface) 142 of the cylinder hole forming portion 14, which is disposed on a side where the recess 13 is formed.

The plunger arrangement 20 includes a plunger 21, a plunger stopper 23, a fuel seal member 24, the seal element 25 and the plunger spring 28.

The plunger 21 is received in the cylinder hole 11 such that the plunger 21 is adapted to be axially reciprocated in an axial direction of the plunger 21 in the cylinder hole 11. The plunger 21 has a large diameter portion 211 and a small diameter portion 213. One end part of the large diameter portion 211 is exposed to the pressurizing chamber 12. The large diameter portion 211 slides along an inner peripheral wall of the cylinder hole 11. The small diameter portion 213 has an outer diameter, which is smaller than that of the large diameter portion 211. The small diameter portion 213 extends from the large diameter portion 211 on a side opposite from the pressurizing chamber 12. The large diameter portion 211 and the small diameter portion 212 are coaxial with each other. A step portion (also referred to as a first step portion) 214 is provided between the large diameter portion 211 and the small diameter portion 213 and forms a boundary (more specifically a boundary surface extending in a direction generally perpendicular to the axial direction of the plunger 21) between the large diameter portion 211 and the small diameter portion 213. A spring seat 27 is provided to an end part of the plunger 21 where the small diameter portion 213 is located. The plunger stopper 23 is provided around the small diameter portion 213 of the plunger 21.

Next, the plunger stopper 23 and placement of the plunger stopper 23 around the small diameter portion 213 of the plunger 21 will be described with reference to FIGS. 2A and 2B.

The plunger stopper 23 has a recessed cross section. A receiving hole 239 extends through a center part of a bottom wall 231 of the plunger stopper 23 to receive the small diameter portion 213 of the plunger 21 therethrough. An inner peripheral surface of the receiving hole 239 is opposed to an outer peripheral wall surface of the small diameter portion 213 such that a predetermined gap is formed between the inner peripheral surface of the receiving hole 239 and the outer peripheral wall surface of the small diameter portion 213. This gap is for communicating between a variable volume chamber 30 and a cylindrical passage 31.

A radially inner portion of a surface of the bottom wall 231 of the plunger stopper 23, which is opposed to the pressurizing chamber 12 side, is opposed to the step portion 214 of the plunger 21. A radially outer portion of the surface of the bottom wall 231 of the plunger stopper 23 contacts the cylinder end 141 of the cylinder hole forming portion 14 of the pump body 10. The radially inner portion of the surface of the bottom wall 231 of the plunger stopper 23, which is opposed to the step portion 214, serves as a stopper portion 232 against the step portion 214 of the plunger 21.

An outer peripheral wall 233 of the plunger stopper 23, which is configured into a cylindrical tubular form, is radially inwardly bent toward the center side, and this bent portion 234 of the outer peripheral wall 233 is engaged with the outer recess 15 of the cylinder hole forming portion 14. Four axial recesses (notches) 235 are formed in the outer peripheral wall 233 of the plunger stopper 23 to divide the outer peripheral wall 233, which includes the bent portion 234, into four sections. Therefore, the outer peripheral wall 233, which is divided into the four sections, has some degree of bendability, and thereby the bent portion 234 of the outer peripheral wall 233 can be engaged to the outer recess 15 or can be disengaged from the outer recess 15 to remove the plunger stopper 23.

The plunger stopper 23 is fixed to the pump body 10 by detachably engaging the bent portion 234 to the outer recess 15 of the cylinder hole forming portion 14, and the stopper portion 232 is opposed to the step portion 214 of the plunger 21 at the location where the stopper portion 232 contacts the cylinder end 141 of the cylinder hole forming portion 14. Therefore, when the plunger 21 is moved in the cylinder hole 11, the step portion 214 contacts the stopper portion 232 of the plunger stopper 23 to limit the movement of the plunger 21. Even when the step portion 214 of the plunger 21 contacts the stopper portion 232, a slide surface 211*b* of the large diameter portion 211 entirely contacts an inner peripheral wall surface 143 of the cylinder hole 11 and is not exposed from the cylinder hole 11.

The fuel seal member 24 is installed around the small diameter portion 213 at an axial location, which is on the spring seat 27 side of the plunger stopper 23, such that the fuel seal member 24 surrounds the small diameter portion 213. The fuel seal member 24 includes a Teflon ring 241 (the name "Teflon" being a registered trademark of DuPont for its brand of fluoropolymer resins) and an O-ring 242 (see FIG. 5 of a third embodiment). The Teflon ring 241 slidably contacts an outer peripheral surface of the small diameter portion 213. The O-ring 242 is placed on a radially outer side of the Teflon ring 241. The fuel seal member 24 limits a thickness of a fuel oil film around the small diameter portion 213 and also limits leakage of fuel toward the engine caused by the slide movement of the plunger 21.

The seal element 25 is installed around the small diameter portion 213. The seal element 25 is configured into an annular form. A portion of the seal element 25 contacts a pressurizing chamber 12 side end portion, a spring seat 27 side end portion and an outer peripheral part of the fuel seal member 24. Another portion of the seal element 25 is fitted into the recess 13, which is formed in the pump body 10 and is configured into an annular form. This portion of the seal element 25 is fixed to the recess 13 by, for example, welding. In this way, the seal element 25 serves as a holder, which fixes the fuel seal member 24.

An oil seal 26 is installed to one end portion of the seal element 25, which is axially located on the spring seat 27 side. The oil seal 26 surrounds the small diameter portion 213 in the circumferential direction. The oil seal 26 slidably contacts the outer peripheral surface of the small diameter portion 213. The oil seal 26 limits a thickness of an oil film, which is formed around the small diameter portion 213, and limits leakage of the oil caused by the slide movement of the plunger 21.

The spring seat 27 is joined to the lower portion of the plunger 21. One end portion of the plunger spring 28 is engaged to the spring seat 27. The other end portion of the plunger spring 28 is engaged to a predetermined end surface of the seal element 25, which is fixed to the pump body 10. Thereby, the seal element 25 also functions as an engaging member of the plunger spring 28.

The plunger spring 28 is engaged to the seal element 25 and the spring seat 27 at the opposite ends, respectively, of the plunger spring 28. The plunger spring 28 functions as a return spring of the plunger 21 to urge the plunger 21 against a tapped (not shown). The plunger 21 is urged against the cam of the camshaft through the tappet by the returning spring function of the plunger spring 28, i.e., the urging force of the plunger spring 28, so that the plunger 21 is axially reciprocated in the cylinder hole 11. The volume of the pressurizing chamber 12 is changed by the reciprocating motion of the plunger 21, so that the fuel is drawn into and pressurized in the pressurizing chamber 12.

The variable volume chamber 30 is an annular space formed by the outer peripheral wall surface of the small diameter portion 213, the step portion 214 of the plunger 21 and the inner peripheral wall surface of the cylinder hole 11 (see a dotted line in FIG. 2A). Specifically, the variable volume chamber 30, which is configured into the generally annular form, surrounds the small diameter portion 213. In response to the reciprocation of the plunger 21, a volume of the variable volume chamber 30 changes by an amount, which is a value obtained by multiplying a moving distance of the plunger 21 by a difference between a cross-sectional area of the large diameter portion 211 and a cross-sectional area of the small diameter portion 213.

Furthermore, the cylindrical passage 31 and an annular passage 32, which are communicated with each other, are formed between the seal element 25 and the pump body 10. A return passage 33, which is communicated with the annular passage 32, is formed in the pump body 10. The variable volume chamber 30 is communicated with the damper chamber 40 through the cylindrical passage 31, the annular passage 32 and the return passage 33.

(b) Next, the damper chamber 40 will be described.

The damper chamber 40 is formed by a recess 41, a cover 42 and a damper unit 43.

The other end portion of the pump body 10, which is axially opposite from the cylinder hole 11, is axially recessed toward the cylinder hole 11 side to form the recess 41. The cover 42, which is configured into a cup form (a tubular body having a bottom), is installed to the pump body 10 to cover the recess 41 and thereby to seal an inside of the recess 41 from an external atmosphere.

The damper unit 43 is placed in the damper chamber 40. The damper unit 43 includes a pulsation damper 44, a bottom side support portion 45 and a cover side support portion 46. The pulsation damper 44 includes two metal diaphragms 441, 442, which are joined together. The bottom side support portion 45 is placed at a bottom portion of the recess 41. The cover side support portion 46 is placed at the cover 42 side.

In the pulsation damper 44, a gas of a predetermined pressure is sealed in the inside space, which is formed between the metal diaphragms 441, 442. When the metal diaphragms 441, 442 are resiliently deformed in response to a change in the pressure of the damper chamber 40, fuel pressure pulsation of the damper chamber 40 is limited or alleviated.

A recess 47, which is configured to correspond with the bottom side support portion 45, is formed in the bottom portion of the recess 41 of the damper chamber 40. The bottom side support portion 45 is positioned by the recess 47. An opening of a fuel inlet (not shown) is formed in the recess 47, so that the fuel, which is supplied from the low pressure pump, is supplied to a radially inner region of the bottom side support portion 45. Specifically, the fuel of the fuel tank is supplied to the damper chamber 40 from the fuel inlet.

A wave spring 48 is placed on the upper side of the cover side support portion 46. Therefore, in the installed state, in which the cover 42 is installed to the pump body 10, the wave spring 48 urges the cover side support portion 46 toward the bottom side support portion 45. Thus, the pulsation damper 44 is secured such that the pulsation damper 44 is clamped between the cover side support portion 46 and the bottom side support portion 45 by a generally uniform clamping force, which is generally uniform in a circumferential direction and is applied from the cover side support portion 46 and the bottom side support portion 45.

(c) The intake valve arrangement 50 will now be described.

The intake valve arrangement 50 includes a supply passage 52, a valve body 53, a seat 54 and an intake valve 55.

The pump body 10 has a tubular portion 51, which extends in a direction that is generally perpendicular to the central axis of the cylinder hole 11. The supply passage 52 is formed in an inside of the tubular portion 51. The valve body 53 is received in the tubular portion 51 and is fixed by an engaging member. The seat 54 is formed in the inside of the valve body 53 such that the seat 54 has a tapered inner peripheral concave surface. The intake valve 55 is placed such that the intake valve 55 is opposed to the seat 54. The intake valve 55 is reciprocated such that the intake valve 55 is guided by an inner peripheral wall of a hole, which is formed in a bottom portion of the valve body 53. When the intake valve 55 is lifted away from the seat 54, the supply passage 52 is opened. In contrast, when the intake valve 55 is seated against the seat 54, the supply passage 52 is closed with the intake valve 55.

A stopper 56 is fixed to an inner peripheral wall of the valve body 53 such that the stopper 56 limits movement of the intake valve 55 in a valve opening direction (the right direction in FIG. 1) of the intake valve 55. A first spring 57 is placed between an inner portion of the stopper 56 and an end surface of the intake valve 55. The first spring 57 urges the intake valve 55 in a valve closing direction (the left direction in FIG. 1).

A plurality of tilted passages 58 is formed in the stopper 56 such that the tilted passages 58 are tilted relative to the axis of the stopper 56 and are provided one after another in a circumferential direction. The fuel, which is supplied through the supply passage 52, is drawn into the pressurizing chamber 12 through the tilted passages 58. Furthermore, the supply passage 52 is communicated with the damper chamber 40 through a pressurizing side passage 59.

(d) The electromagnetic drive arrangement 60 will be described.

The electromagnetic drive arrangement 60 includes a connector 61, a stationary core 62, a movable core 63 and a flange 64.

The connector 61 includes a coil 611 and terminals 612. When an electric power is supplied to the coil 611 through the terminals 612, a magnetic field is generated from the coil 611. The stationary core 62 is made of a magnetic material and is received in the inside of the coil 611. The movable core 63 is made of a magnetic material and is opposed to the stationary core 62. The movable core 63 is adapted to axially reciprocate at a location radially inward of the flange 64.

The flange 64 is made of a magnetic material and is installed to the tubular portion 51 of the pump body 10. The flange 64 holds the connector 61 in corporation with the pump body 10 and closes an end portion of the tubular portion 51. A guide tube 65 is installed to an inner peripheral wall of a hole, which is formed in a center of the flange 64. A tubular member 66, which is made of a non-magnetic material, limits magnetic short circuit between the stationary core 62 and the flange 64.

A needle 67 is configured into a generally cylindrical tubular form and is guided by an inner peripheral wall of the guide tube 65 such that the needle 67 is adapted to be reciprocated along the inner peripheral wall of the guide tube 65. One end portion of the needle 67 is fixed to the movable core 63, and the other end portion of the needle 67 is contactable with an end surface of the intake valve 55, which is located on a side where the electromagnetic drive arrangement 60 is located.

A second spring 68 is placed between the stationary core 62 and the movable core 63. The second spring 68 urges the movable core 63 in the valve opening direction by an urging force, which is larger than an urging force of the first spring 57, which urges the intake valve 55 in the valve closing direction.

When the coil 611 is not energized, the movable core 63 and the stationary core 62 are spaced from each other by a resilient force of the second spring 68. Thereby, the needle 67, which is integrated with the movable core 63, is moved toward the intake valve 55 side to urge the intake valve 55 with the end surface of the needle 67, so that the intake valve 55 is opened.

(e) The discharge valve arrangement 70 will be described.

The discharge valve arrangement 70 includes a discharge passage 71 and a discharge valve device 80.

The discharge passage 71 is formed in the pump body 10 such that the discharge passage 71 extends in a direction that is generally perpendicular to the central axis of the cylinder hole 11. One end of the discharge passage 71 is communicated with the pressurizing chamber 12, and the other end of the discharge passage 71 is communicated with the fuel outlet 72. The discharge valve device 80 is installed to the discharge passage 71.

The discharge valve device 80 includes a discharge valve member 82, a spring 83 and an adjusting pipe 84.

The discharge valve member 82 is received in the pump body 10 such that the discharge valve member 82 is opposed to a valve seat 85 of the pump body 10.

The spring 83, which serves as an urging member, is received in the pump body 10 on a fuel outlet 72 side of the discharge valve member 82. One end portion of the spring 83 contacts a second end surface of the discharge valve member 82. The adjusting pipe 84, which is configured into a cylindrical tubular form, is received in the pump body 10 on a fuel outlet 72 side of the spring 83. The adjusting pipe 84 serves as a support member such that the other end portion of the spring 83 is engaged to the adjusting pipe 84.

As discussed above, the discharge valve arrangement 70 includes the discharge valve device 80. The discharge valve device 80 includes the discharge valve member 82, the spring 83 and the adjusting pipe 84, and the discharge valve member 82 is urged by the urging force of the spring 83 that is engaged to the adjusting pipe 84 at the other end portion of the spring 83.

The discharge valve device 80 of the discharge valve arrangement 70 is operated as follows.

When the plunger 21 is moved upward in the cylinder hole 11, the pressure of fuel in the pressurizing chamber 12 is increased. When the force, which is applied to the discharge valve member 82 by the fuel on the pressurizing chamber 12 side (the upstream side) of the discharge valve member 82, becomes larger than a sum of the resilient force of the spring 83 and the force of the fuel on the fuel outlet 72 side (the downstream side) of the discharge valve member 82, the discharge valve member 82 is lifted away from the valve seat 85. That is, the discharge valve device 80 is placed into a valve open state. In this way, the high pressure fuel, which is pressurized in the pressurizing chamber 12, is discharged to the fuel outlet 72 through the discharge passage 71.

In contrast, when the plunger 21 is moved downward in the cylinder hole 11, the pressure of fuel in the pressurizing chamber 12 is decreased. When the force, which is applied to the discharge valve member 82 by the fuel on the upstream side of the discharge valve member 82, becomes smaller than the sum of the resilient force of the spring 83 and the force of fuel on the downstream side of the discharge valve member 82, the discharge valve member 82 is seated against the valve seat 85 of the pump body 10. That is, the discharge valve device 80 is placed into a valve closed state. In this way, it is possible to limit a backflow of the fuel from the downstream side of the discharge valve member 82 into the pressurizing chamber 12 located on the upstream side of the discharge valve member 82.

As discussed above, the discharge valve device 80 of the discharge valve arrangement 70 serves as a check valve, which limits the backflow of the high pressure fuel that is discharged from the pressurizing chamber 12 toward the fuel outlet 72.

Next, the operating the high pressure pump 1 will be described.

(1) Intake Stroke

When the plunger 21 is moved downward from the top dead center toward the bottom dead center in the cylinder hole 11 by the rotation of the camshaft, the volume of the pressurizing chamber 12 is increased, and the fuel in the pressurizing chamber 12 is depressurized. At this time, in the discharge valve arrangement 70, the discharge valve member 82 of the discharge valve device 80 is seated against the valve seat 85, so that the discharge passage 71 is closed. Furthermore, in the intake valve arrangement 50, the intake valve 55 is moved in the right direction in FIG. 1 due to the pressure difference between the pressurizing chamber 12 and the supply passage 52 against the urging force of the first spring 57, so that the intake valve 55 is placed in a valve open state. At this time, the energization of the coil 611 of the electromagnetic drive arrangement 60 is stopped, so that the movable core 63 and the needle 67 integrated therewith are moved by the urging force of the second spring 68 in the right direction in FIG. 1. Therefore, the needle 67 and the intake valve 55 contact with each other, and the intake valve 55 is held in the valve open state. Thereby, the fuel is drawn from the supply passage 52 into the pressurizing chamber 12.

In the intake stroke, the plunger 21 is moved downward, so that the volume of the variable volume chamber 30 is decreased. Thereby, the fuel of the variable volume chamber 30 is supplied to the damper chamber 40 through the cylindrical passage 31, the annular passage 32 and the return passage 33.

In this instance, a ratio between the cross-sectional area of the large diameter portion 211 and the cross-sectional area of the variable volume chamber 30 is generally 1:0.6. Thus, a ratio between the amount of increase in the volume of the pressurizing chamber 12 and the amount of decrease in the volume of the variable volume chamber 30 is generally 1:0.6. Therefore, about 60% of the fuel, which is drawn into the pressurizing chamber 12, is supplied from the variable volume chamber 30, and about 40% of the remaining fuel is drawn from the fuel inlet. In this way, an intake efficiency of fuel into the pressurizing chamber 12 is improved.

(2) Metering Stroke

When the plunger 21 is moved upward from the bottom dead center toward the top dead center in the cylinder hole 11 by the rotation of the camshaft, the volume of the pressurizing chamber 12 is decreased. At this time, the energization of the coil 611 is stopped until the predetermined timing (predetermined time point), so that the needle 67 and the intake valve 55 are urged by the urging force of the second spring 68 in the right direction in FIG. 1 and are thereby placed at the right side position in FIG. 1. Thereby, the supply passage 52 is kept in the open state. Thus, the low pressure fuel, which is once drawn into the pressurizing chamber 12, is returned to the supply passage 52. As a result, the pressure of the pressurizing chamber 12 is not increased.

In the metering stroke, the plunger 21 is moved upward, so that the volume of the variable volume chamber 30 is increased. Thereby, the fuel of the damper chamber 40 is supplied to the variable volume chamber 30 through the cylindrical passage 31, the annular passage 32 and the return passage 33.

At this time, about 60% of the volume of the low pressure fuel, which is discharged from the pressurizing chamber 12 toward the damper chamber 40 side, is drawn into the variable volume chamber 30 from the damper chamber 40. Thereby, about 60% of the fuel pressure pulsation is reduced.

(3) Pressurizing Stroke

At the predetermined timing (predetermined time point) during the movement of the plunger 21 from the bottom dead center toward the top dead center in the cylinder hole 11, the coil 611 is energized. Then, a magnetic attractive force is generated between the stationary core 62 and the movable core 63 due to the generation of the magnetic field from the coil 611. When this magnetic attractive force becomes larger than a difference between the resilient force of the second spring 68 and the resilient force of the first spring 57, the movable core 63 and the needle 67 are moved toward the stationary core 62 side (in the left direction in FIG. 1). Thereby, the urging force of the needle 67 against the intake valve 55 is released. The intake valve 55 is moved toward the seat 54 side by the resilient force of the first spring 57 and the force generated by the flow of the low pressure fuel, which is outputted from the pressurizing chamber 12 toward the damper chamber 40. Thus, the intake valve 55 is seated against the seat 54, so that the supply passage 52 is closed.

Since the time of seating the intake valve 55 against the seat 54, the pressure of the fuel in the pressurizing chamber 12 is increased as the plunger 21 is moved upward toward the top dead center of the plunger 21. In the discharge valve arrangement 70, the discharge valve member 82 of the discharge valve device 80 is opened when the force, which is applied to the discharge valve member 82 by the pressure of the fuel on the upstream side of the discharge valve member 82, becomes larger than a sum of the urging force of the spring 83 and the force, which is applied to the discharge valve member 82 by the pressure of the fuel on the downstream side of the discharge valve member 82. In this way, the high pressure fuel, which is pressurized in the pressurizing chamber 12, is discharged from the fuel outlet 72 through the discharge passage 71.

In the middle of the pressurizing stroke, the energization of the coil 611 is stopped. The force, which is applied to the intake valve 55 from the pressure of the fuel in the pressurizing chamber 12, is larger than the urging force of the second spring 68, so that the intake valve 55 is kept in the valve closed state.

The high pressure pump 1 repeats the intake stroke, the metering stroke and the pressurizing stroke, so that the fuel, which is required by the internal combustion engine, is pressurized and is discharged from the high pressure pump 1.

When the timing of energizing the coil 611 is shifted to earlier timing, the time period of the metering stroke is shortened, and the time period of the pressurizing stroke is lengthened. Therefore, the fuel, which is returned from the pressurizing chamber 12 to the supply passage 52, is reduced, and the fuel, which is outputted from the discharge passage 71, is increased. In contrast, when the timing of energizing the coil 611 is shifted to later timing, the time period of the metering stroke is lengthened, and the time period of the discharge stroke is shortened. Therefore, the fuel, which is returned from the pressurizing chamber 12 to the supply passage 52, is increased, and the fuel, which is outputted from the discharge passage 71, is decreased.

As discussed above, the quantity of fuel, which is discharged from the high pressure pump 1, is controlled to the required quantity, which is required by the internal combustion engine, by controlling the timing of energizing the coil 611.

Next, advantages of the present embodiment will be described.

In the present embodiment, the plunger stopper 23 is fixed to the pump body 10 by detachably engaging the bent portion 234 of the plunger stopper 23 to the outer recess 15 of the cylinder hole forming portion 14 of the pump body 10, and the stopper portion 232 of the plunger stopper 23 is opposed to the step portion 214 of the plunger 21.

Thereby, after the assembling of the high pressure pump 1, the stopper portion 232 of the plunger stopper 23 implements the stopper function at the time of reciprocating the plunger 21 in the cylinder hole 11. Also, the stopper portion 232 of the plunger stopper 23 implements the stopper function of limiting falling off of the plunger 21 from the cylinder hole 11 at the process of assembling the high pressure pump 1 and at the process of installing the high pressure pump 1 to the engine.

Furthermore, the axial position of the stopper portion 232 of the plunger stopper 23 in the axial direction of the cylinder hole 11 is the same as that of the cylinder end 141 of the cylinder hole forming portion 14. Therefore, even when the step portion 214 of the plunger 21 contacts the stopper portion 232 of the plunger stopper 23 upon the movement of the plunger 21 in the cylinder hole 11, the slide surface 211*b* of the large diameter portion 211 entirely contacts the inner peripheral wall surface 143 of the cylinder hole 11 and is not exposed from the cylinder hole 11. Therefore, the slide surface 211*b* of the plunger 21 is held in the protected state, in which the slide surface 211*b* of the plunger 21 is protected from a damage caused by hitting or adhesion of foreign objects (e.g., debris).

That is, during the operation of the high pressure pump 1, it is possible to protect the slide surface 211*b* of the plunger 21 from the damage caused by hitting or the adhesion of foreign objects, and thereby it is possible to limit the slide malfunction of the plunger 21. Furthermore, at the process of assembling the high pressure pump 1 or the process of installing the high pressure pump 1 to the engine, the falling off of the plunger 21 from the cylinder hole 11 is limited in the protected state, in which the slide surface 211*b* of the plunger 21 is protected from the damage caused by hitting or the adhesion of foreign objects.

Now, a modification of the first embodiment will be described.

In the above-described structure, the position of the stopper portion 232 of the plunger stopper 23 in the axial direction of the cylinder hole 11 is the same as that of the cylinder end 141 of the cylinder hole forming portion 14. Alternatively, even when the position of the stopper portion 232 of the plunger stopper 23 is displaced from the cylinder end 141 of the cylinder hole forming portion 14 toward the pressurizing chamber 12, the advantages, which are similar to those discussed above, can be achieved.

Figure 3:
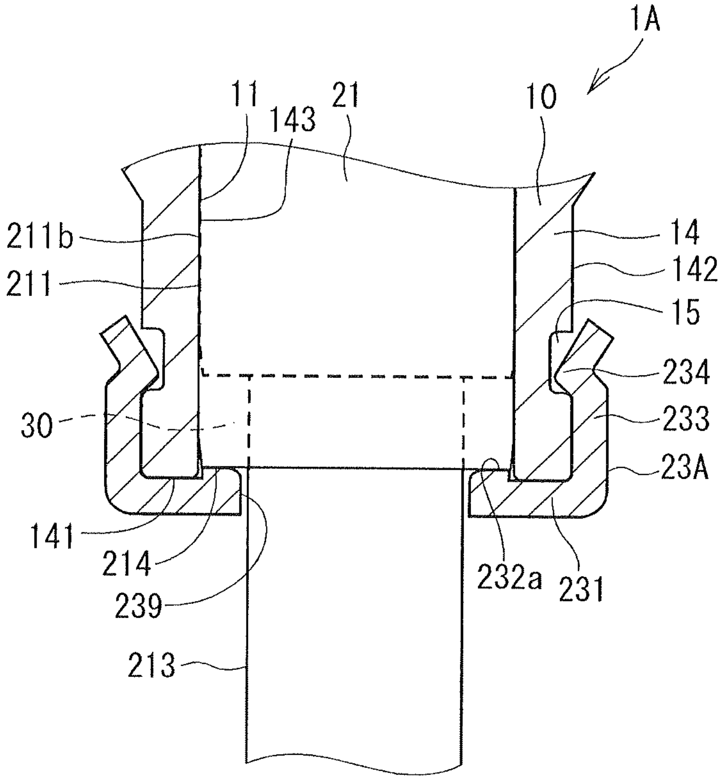
FIG. 3 is a partial cross-sectional view showing a state, in which a plunger stopper is installed to a plunger arrangement of a high pressure pump in a modification of the first embodiment.

For example, as shown in FIG. 3, a plunger stopper 23A of a modification of the first embodiment has a projection, which is located at the center side area of the bottom wall 231 and axially projects toward the pressurizing chamber 12 side. A stopper portion 232*a* is formed in this projection, which is opposed to the step portion 214 of the plunger 21. Therefore, the stopper portion 232*a* is located on the pressurizing chamber 12 side of the radially outer portion of the surface of the bottom wall 231 of the plunger stopper 23, which contacts the cylinder end 141 of the cylinder hole forming portion 14.

(Second Embodiment)

Figure 4A:
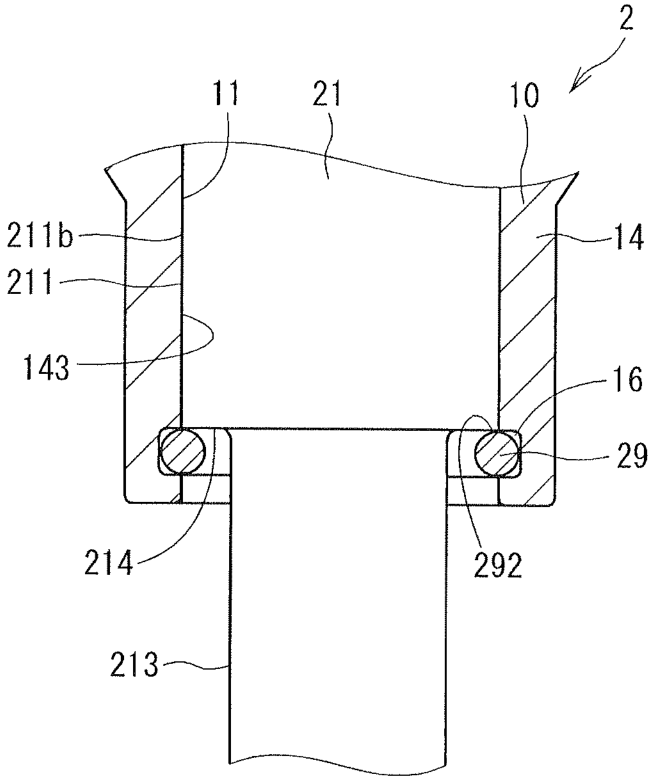
FIG. 4A is a partial cross-sectional view showing a state, in which a plunger stopper is installed to a plunger arrangement of a high pressure pump according to a second embodiment of the present invention.
Figure 4B:
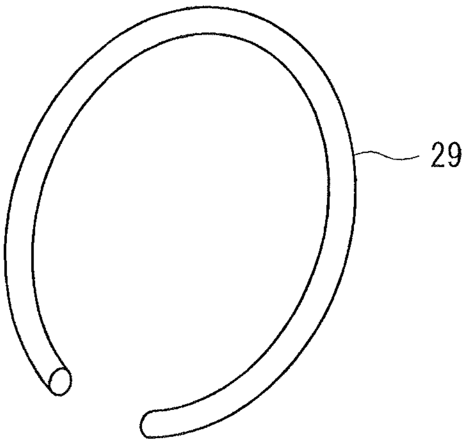
FIG. 4B is a perspective view of the plunger stopper shown in FIG. 4A.

FIG. 4A shows a state, in which a plunger stopper is installed to a pump body of a high pressure pump according to a second embodiment of the present invention. FIG. 4B is a perspective view of the plunger stopper shown in FIG. 4A.

In the following embodiments, components, which are similar to those of the first embodiment, will be indicated by the same reference numerals and will not be redundantly described.

An inner recess 16, which is configured into an annular form (annular groove) and extends in the circumferential direction, is formed in the inner peripheral wall surface of the cylinder hole 11, i.e., in the inner peripheral wall surface 143 of the cylinder hole forming portion 14 of the pump body 10 of the high pressure pump 2 of the present embodiment.

The plunger stopper 29 has a generally circular cross section and is formed as a string-shaped member (a C-shaped member) having a predetermined flexibility. The plunger stopper 29 is engaged in the inner recess 16, which is configured into the annular form. A portion of the plunger stopper 29, which is engaged in the inner recess 16, radially inwardly projects from the inner recess 16 toward the central axis of the cylinder hole 11. A cylindrical surface portion of the plunger stopper 29, which radially inwardly projects from the inner recess 16 and is directed toward the pressurizing chamber 12 side to oppose the step portion 214 of the plunger 21, is a stopper portion 292 of the plunger stopper 29 against the step portion 214 of the plunger 21.

The plunger stopper 29 is the string-shaped member (the C-shaped member), which has the predetermined flexibility. Therefore, the plunger stopper 29 can be engaged in the inner recess 16 and can be disengaged from the inner recess 16 to remove the plunger stopper 29.

Next, advantages of the present embodiment will be described.

In the present embodiment, the plunger stopper 29 is fixed to the pump body 10 by detachably engaging the plunger stopper 29 in the inner recess 16. Furthermore, the stopper portion 292 of the plunger stopper 29 is opposed to the step portion 214 of the plunger 21 at a location, which is displaced from the cylinder end 141 of the cylinder hole forming portion 14 toward the pressurizing chamber 12.

Therefore, similar to the first embodiment, even when the step portion 214 of the plunger 21 contacts the stopper portion 292 upon the movement of the plunger 21 in the cylinder hole 11, the slide surface 211*b* of the large diameter portion 211 entirely contacts the inner peripheral wall surface 143 of the cylinder hole 11 and does not project from the cylinder hole 11.

Thereby, it is possible to limit the slide malfunction of the plunger 21 during the operation of the high pressure pump 2 in the protected state, in which the slide surface 211*b* of the plunger 21 is protected from the damage by hitting or the adhesion of a foreign object. Furthermore, it is possible to limit the falling off of the plunger 21 from the cylinder hole 11 at the process of assembling the high pressure pump 2 or at the process of installing the high pressure pump 2 to the engine.

(Third Embodiment)

Figure 5:
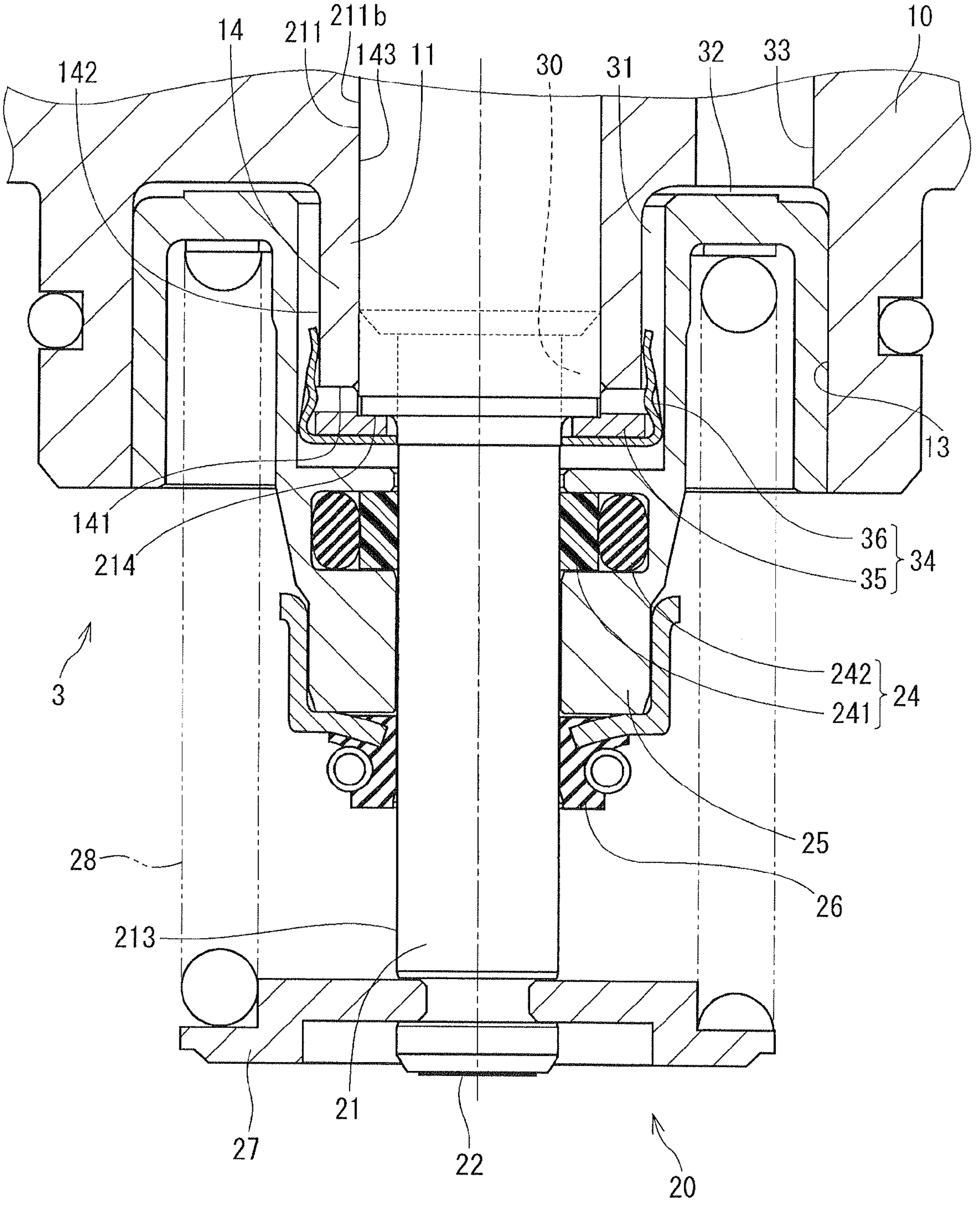
FIG. 5 is an enlarged partial cross-sectional view showing a plunger arrangement of a high pressure pump according to a third embodiment of the present invention.
Figure 6A:
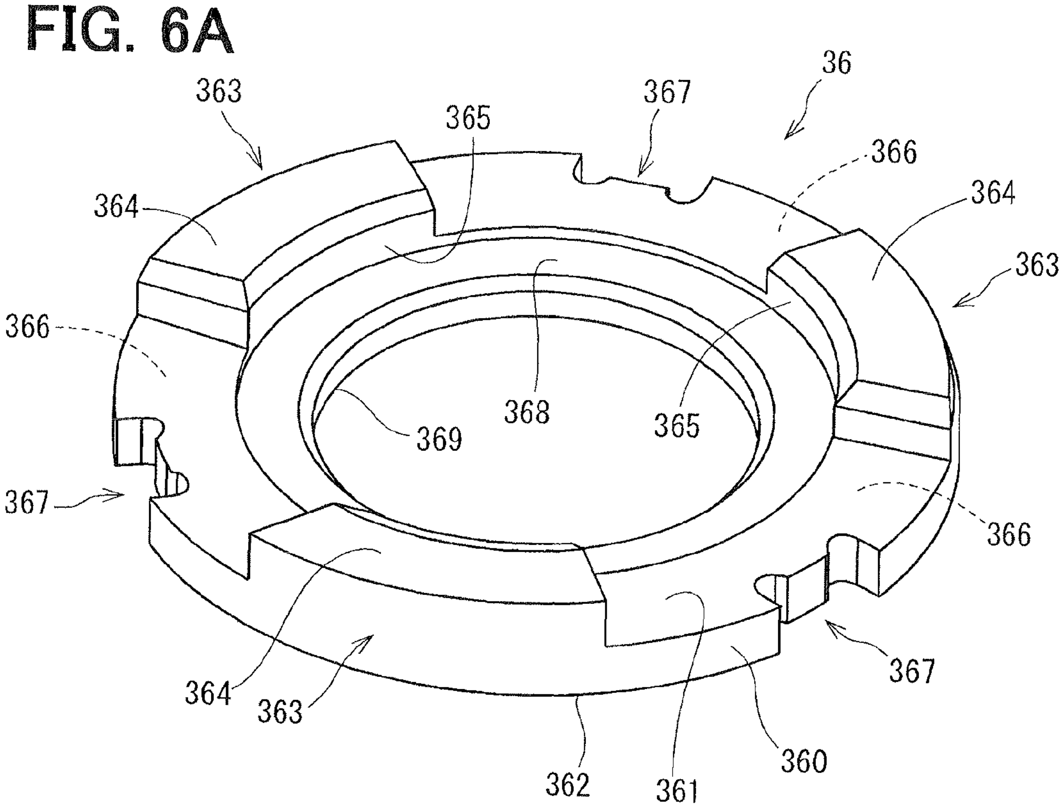
FIG. 6A is a perspective view of a second ring of a plunger stopper of the third embodiment.
Figure 6B:
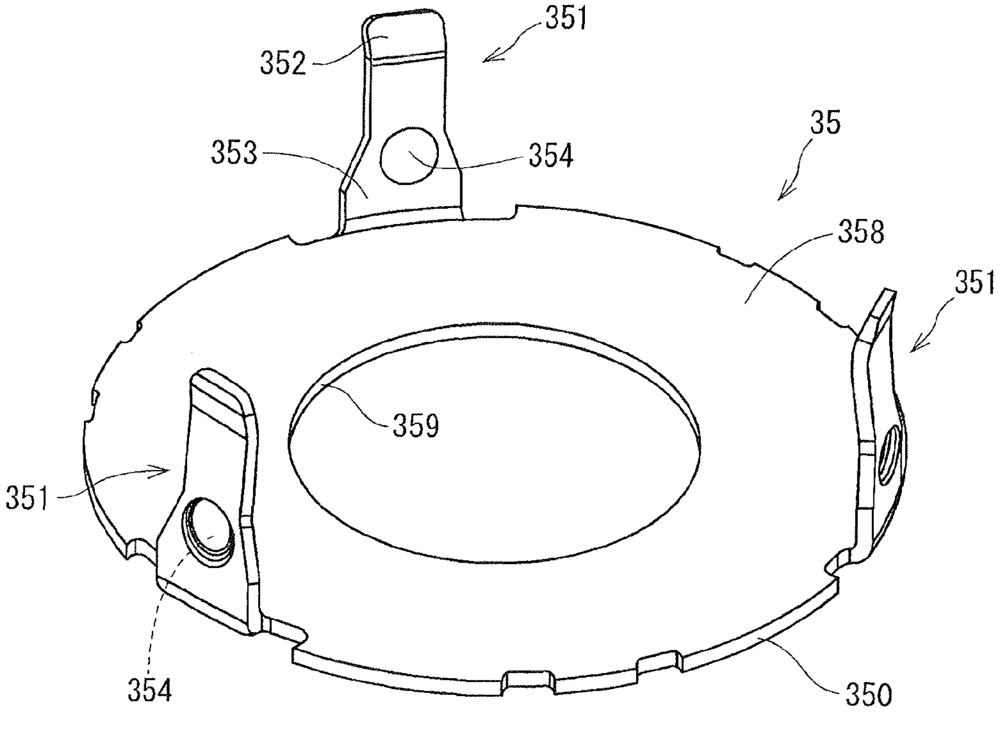
FIG. 6B is a perspective view of a first ring of the plunger stopper of the third embodiment.
Figure 7A:
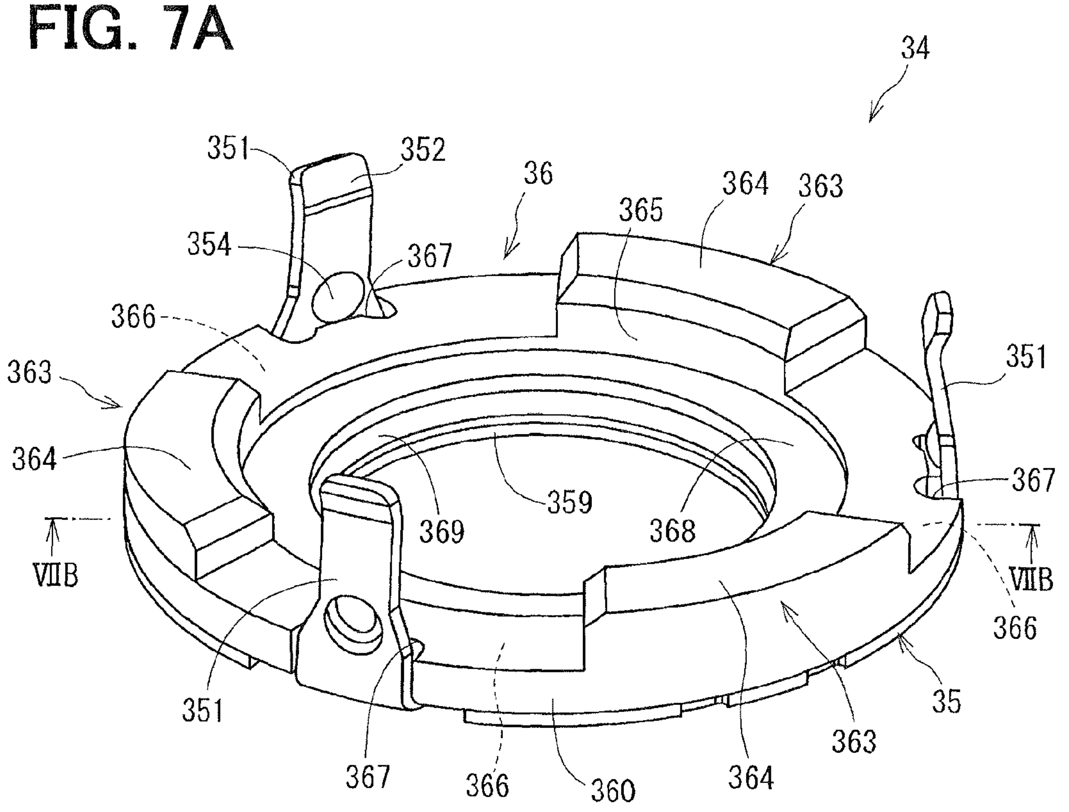
FIG. 7A is a perspective view of the plunger stopper of the third embodiment.
Figure 7B:
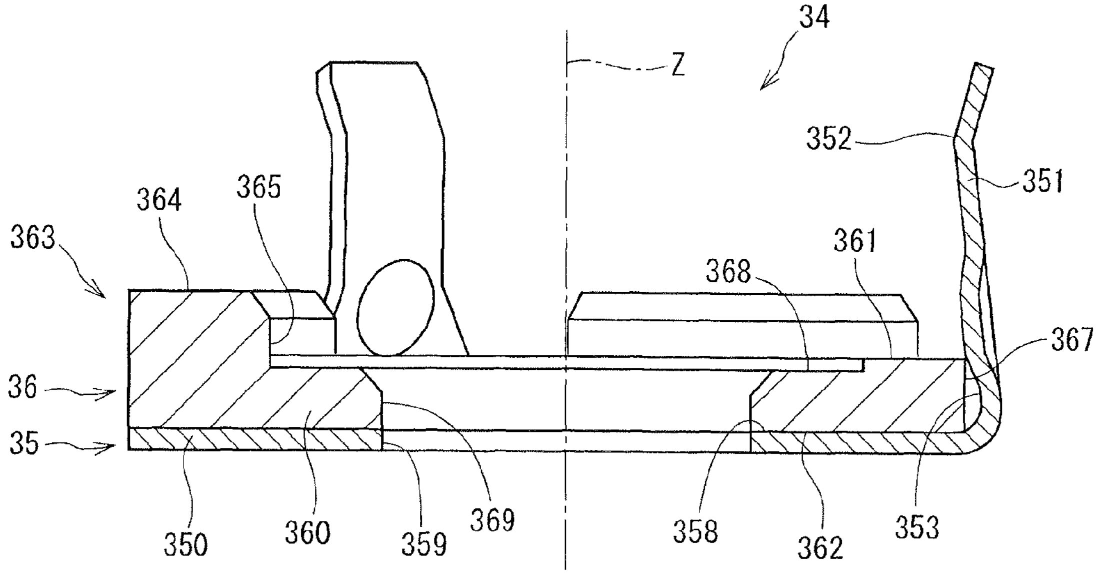
FIG. 7B is a cross-sectional view taken along line VIIB-VIIB in FIG. 7A.

FIG. 5 is an enlarged partial cross-sectional view showing a plunger arrangement of a high pressure pump 3 according to a third embodiment of the present invention. FIG. 6A is a perspective view of a second ring of a plunger stopper of the third embodiment. FIG. 6B is a perspective view of a first ring of the plunger stopper of the third embodiment. FIG. 7A is a perspective view of the plunger stopper of the third embodiment. FIG. 7B is a cross-sectional view of the plunger stopper shown in FIG. 7A.

As shown in FIG. 5, similar to the plunger stopper 23 of the first embodiment, the plunger stopper 34 of the third embodiment is fixed to the outer peripheral wall surface 142 of the cylinder hole forming portion 14. However, unlike the plunger stopper 23 of the first embodiment, in which the bent portion 234 is engaged to the outer recess 15 of the outer peripheral wall surface 142, the plunger stopper 34 of the third embodiment is fixed to the outer peripheral wall surface 142 as follows. Specifically, a plurality of engaging portions 351 is radially inwardly urged by the resilient force thereof to tightly hold the outer peripheral wall surface 142 of the cylinder hole forming portion 14.

The plunger stopper 34 includes a first ring 35 and a second ring 36 shown in FIGS. 6A and 6B. In the present embodiment, the first ring 35 and the second ring 36 are formed from metal, such as stainless steel, through a press working process or a stamping process.

Specifically, the first ring 35 is made of, for example, a thin spring steel plate, which has a relatively small plate thickness. A receiving hole 359, which is adapted to receive the small diameter portion 213 of the plunger 21, is formed about an axis Z at a center part of a main body 350.

Three engaging portions 351 are provided one after another along an outer peripheral edge part of the main body 350 at generally equal intervals in a circumferential direction and axially project toward the pressurizing chamber 12. Each engaging portion 351 is bent in a direction (upward direction in FIG. 6B), which is generally perpendicular to a base surface 358 of the main body 350. Specifically, each engaging portion 351 has a fit part 352 at a radially inner surface of an upper end part of the engaging portion 351. Each engaging portion 351 is tilted radially inward relative to a direction, which is perpendicular to the base surface 358, so that a diameter of an imaginary circle, which inscribes the fit parts 352 of the engaging portions 351, is slightly smaller than a diameter of the outer peripheral wall surface 142 of the cylinder hole forming portion 14. Thereby, when the plunger stopper 34 is installed to the cylinder hole forming portion 14, the engaging portions 351 radially inwardly exert the resilient force.

When the three engaging portions 351 are provided one after another at generally equal intervals in the circumferential direction, the number of the engaging portions 351 can be minimized with the good balance. However, the number of the engaging portions and the locations of the engaging portions are not limited to the above-discussed ones and may be modified in any appropriate manner in a modification(s) thereof.

A projection 354, which radially inwardly projects, is formed in an intermediate part of each engaging portion 351 in a bending direction of the engaging portion 351. When the first ring 35 and the second ring 36 are assembled together, the projection 354 is engaged with a main body 360 of the second ring 36 to limit separation, i.e., detachment of the first ring 35 and the second ring 36 from each other. At this time, a base 353 of each engaging portion 351 is radially opposed to an outer peripheral wall surface of the main body 360 of the second ring 36.

The second ring 36 is made of a plate material, which has a relative large thickness that is larger than that of the first ring 35. A receiving hole 369, which is adapted to receive the small diameter portion 213 of the plunger 21 therethrough, is formed at the center part of the main body 360 to correspond with the receiving hole 359 of the first ring 35. When the first ring 35 and the second ring 36 are assembled together, a lower surface 362 of the main body 360 of the second ring 36 contacts the base surface 358 of the first ring 35. The plate thickness of the main body 360, which is measured in the direction of the axis Z, is relatively large in comparison to the main body 350 of the first ring 35. Therefore, the second ring 36 can increase the rigidity of the plunger stopper 34 to limit, for example, deformation of the plunger stopper 34 caused by the fuel pressure.

Three radial recesses 367 are formed at three locations, which respectively correspond to the locations of the engaging portions 351 of the first ring 35, along the outer peripheral edge part of the main body 360. When the first ring 35 and the second ring 36 are assembled together, the engaging portions 351 are engaged with the radial recesses 367, respectively, so that the engaging portions 351 are located on a radially inner side of the outer peripheral surface of the second ring 36. Therefore, an outer diameter of the second ring 36 can be coincided with the inner diameter of the seal element 25, and thereby the space can be effectively used (see FIG. 5). Also, relative rotation between the first ring 35 and the second ring 36 can be limited.

Furthermore, three protrusions 363, which protrude upward in FIG. 6A, are formed in the main body 360 such that each protrusion 363 is placed between corresponding adjacent two of the radial recesses 367 in the circumferential direction. A height of an upper surface 364 of each protrusion 363, which is measure in the direction of the Z axis, is generally the same for all of the protrusions 363. When the upper surface 364 of each protrusion 363 contacts the cylinder end 141, the plunger stopper 34 is axially positioned relative to the cylinder hole forming portion 14.

A circumferential gap between each adjacent two of the protrusions 363 forms a communication passage 366. A height (depth) of the communication passage 366 corresponds to a difference between an upper surface 361 of the main body 360 and the upper surface 364 of each protrusion 363. The communication passages 366 communicate between the variable volume chamber (radially inner area) 30, which is located on a radially inner side of the plunger stopper 34, and the cylindrical passage (radially outer area) 31, which is located on the radially outer side of the plunger stopper 34.

An inner diameter of an imaginary circle, which circumferentially extends along inner peripheral walls 365 of the protrusions 363, is slightly larger than the outer diameter of the large diameter portion 211 of the plunger 21. Therefore, the inner peripheral walls 365 of the protrusions 363 can guide the large diameter portion 211 of the plunger 21. A stopper portion 368, which is configured into an annular form, is formed in the second ring 36 at a radial location between the receiving hole 369 and the imaginary circle, which circumferentially extends along the inner peripheral walls 365 of the protrusions 363. The stopper portion 368 is axially recessed from the upper surface 361 of the main body 360 on the lower side of the upper surface 361 in FIG. 6A, i.e., on the axial side opposite from the protrusions 363. When the plunger 21 is moved downward, the step portion 214 of the plunger 21 contacts the stopper portion 368, so that the stopper portion 368 limits the movement of the plunger 21.

Thereby, after the assembling of the high pressure pump 3, the stopper portion 368 of the plunger stopper 34 implements the stopper function at the time of reciprocating the plunger 21 in the cylinder hole 11. Also, the stopper portion 368 of the plunger stopper 34 implements the stopper function of limiting falling off of the plunger 21 from the cylinder hole 11 at the process of assembling the high pressure pump 3 and at the process of installing the high pressure pump 3 to the engine.

In the present embodiment, at the time of downwardly moving the plunger 21, fuel, which is provided through the communication passages 366, contacts a part of the large diameter portion 211 of the plunger 21, which corresponds to the communication passages 366. Therefore, it looks like that the part of the slide portion of the plunger 21 is exposed. However, at the time of reciprocating the plunger 21 in the cylinder hole 11 during the operation of the high pressure pump 3 after the assembling of the high pressure pump 3, or at the time of limiting falling off of the plunger 21 from the cylinder hole 11 in the process of assembling the high pressure pump 3 or in the process of installing the high pressure pump 3 to the engine, the slide surface 211*b* of the plunger 21 is kept in the protected state, in which the slide surface 211*b* of the plunger 21 is protected from, for example, the damage by hitting.

Furthermore, in the present embodiment, the first ring 35, which includes the engaging portions 351, and the second ring 36, which includes the protrusions 363, are assembled together to form the plunger stopper 34. In this way, the first ring 35, which needs to have the resiliency, and the second ring 36, which needs to have the rigidity, can be formed from the corresponding plate material, which has the plate thickness that is suitable for the press working thereof. Thus, the manufacturing efficiency can be improved, and the total manufacturing costs can be reduced.

Now, first to fifth modifications of the third embodiment will be described with reference to FIGS. 8A to 12B. These modifications differ from the third embodiment discussed above with respect to the structure of engaging the first ring and the second ring together and of limiting detachment between the first ring and the second ring. Specifically, in place of the projections 354 of the third embodiment shown in FIGS. 6A to 7B, for example, auxiliary claws are provided. In the first to third modifications, the second ring 36 is the same as that of the third embodiment shown in FIGS. 6A to 7B.

Figure 8A:
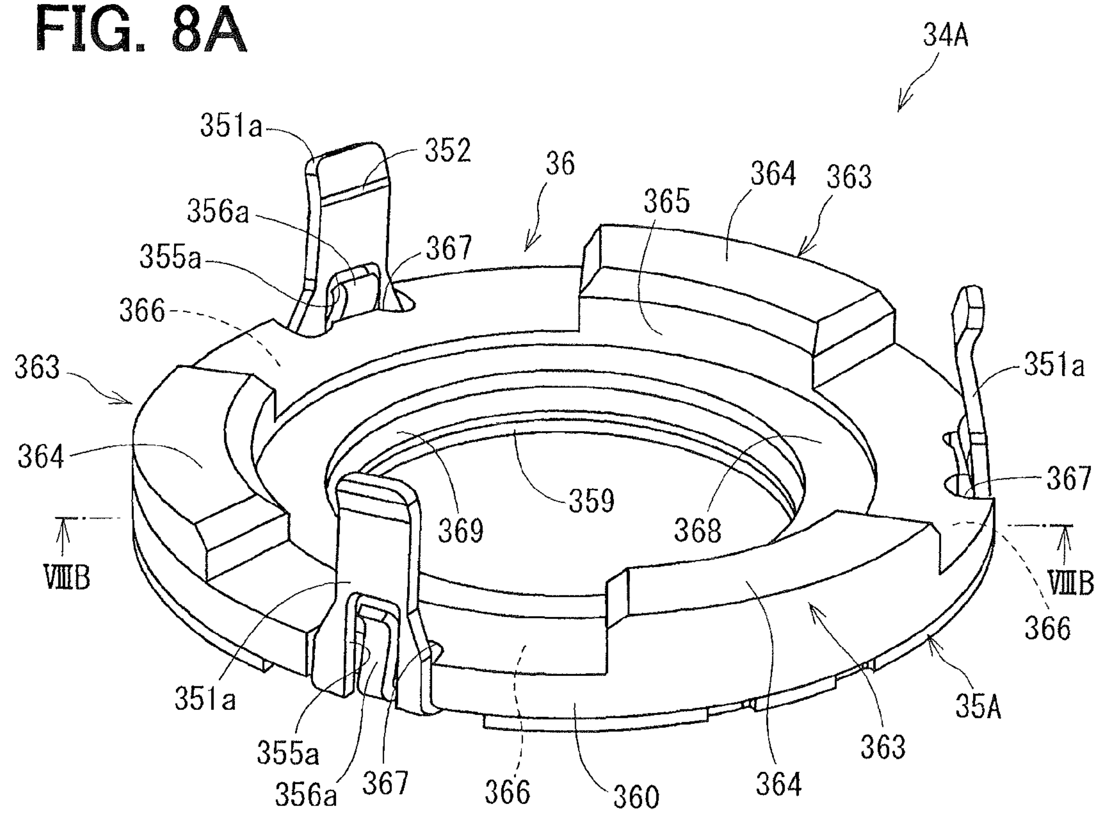
FIG. 8A is a perspective view of a plunger stopper in a first modification of the third embodiment.
Figure 8B:
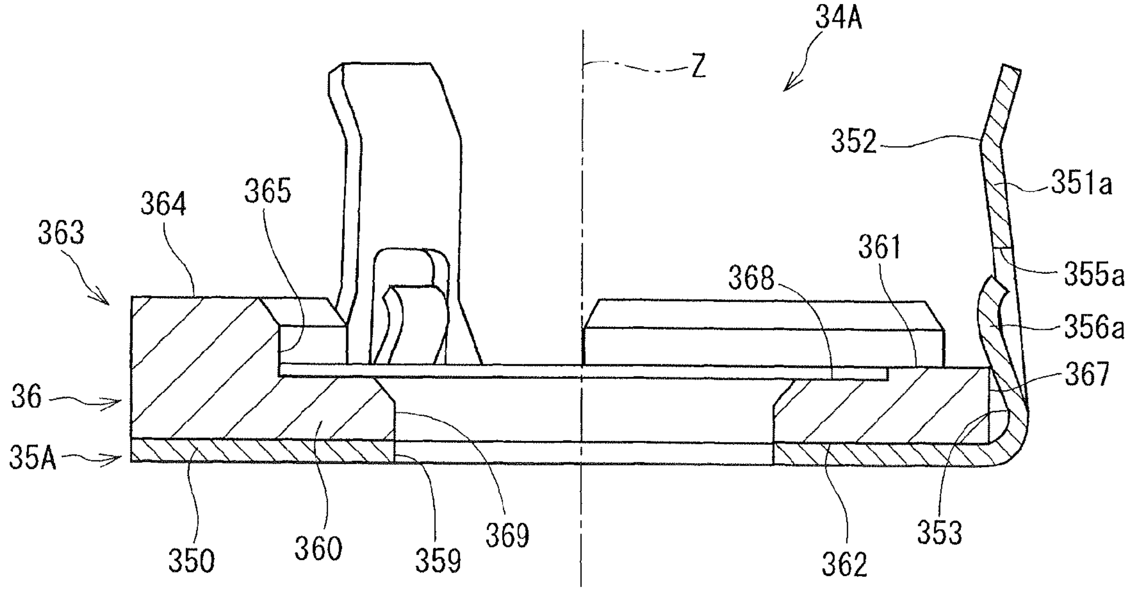
FIG. 8B is a cross-sectional view taken along line VIIIB-VIIIB in FIG. 8A.

With reference to FIGS. 8A and 8B, in a plunger stopper 34A of the first modification of the third embodiment, a window 355*a* is formed in each of three engaging portions 351*a* of a first ring 35A, and an auxiliary claw 356*a* is provided in the window 355*a* of the engaging portion 351*a*. The auxiliary claw 356*a* is bent upward from a base 353 of the engaging portion 351*a* separately from a main claw of the engaging portion 351*a* (i.e., from the rest of the engaging portion 351*a*), which forms the fit part 352. Each auxiliary claw 356*a* radially inwardly exerts the resilient force and is thereby urged against the corresponding upper surface 361 or the corresponding radial recess 367 of the main body 360 of the second ring 36 and thereby to limit detachment of the second ring 36 from the first ring 35A.

Figure 9A:
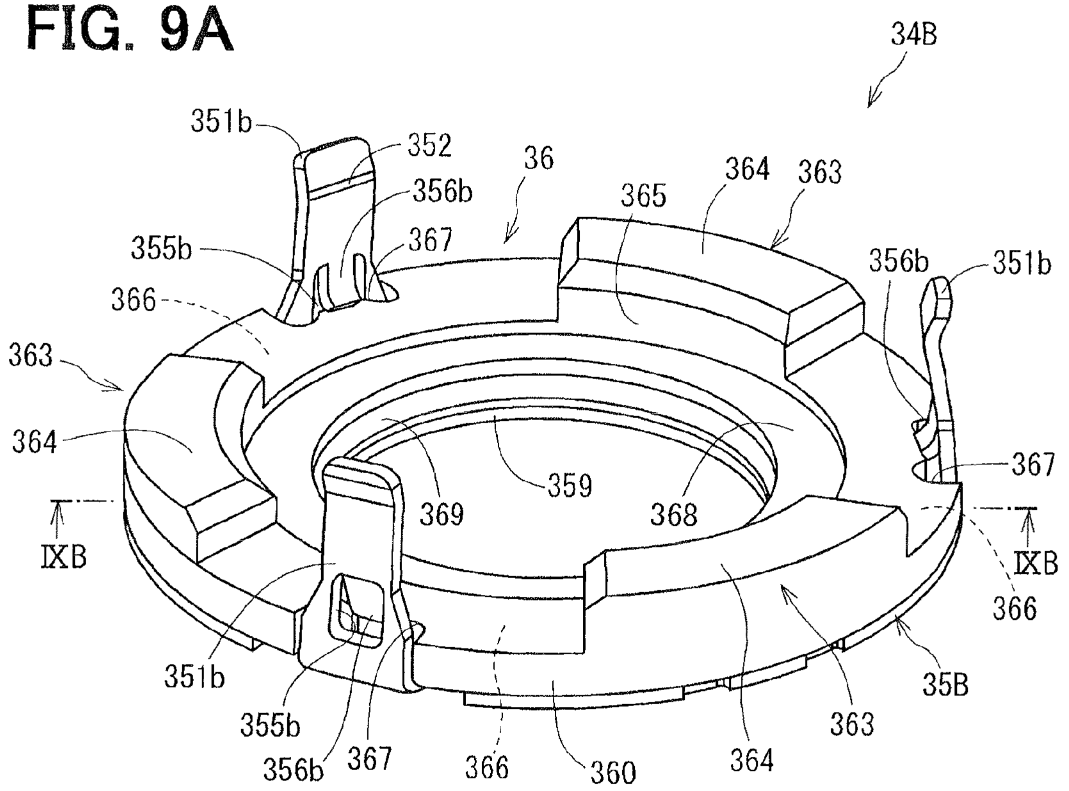
FIG. 9A is a perspective view of a plunger stopper in a second modification of the third embodiment.
Figure 9B:
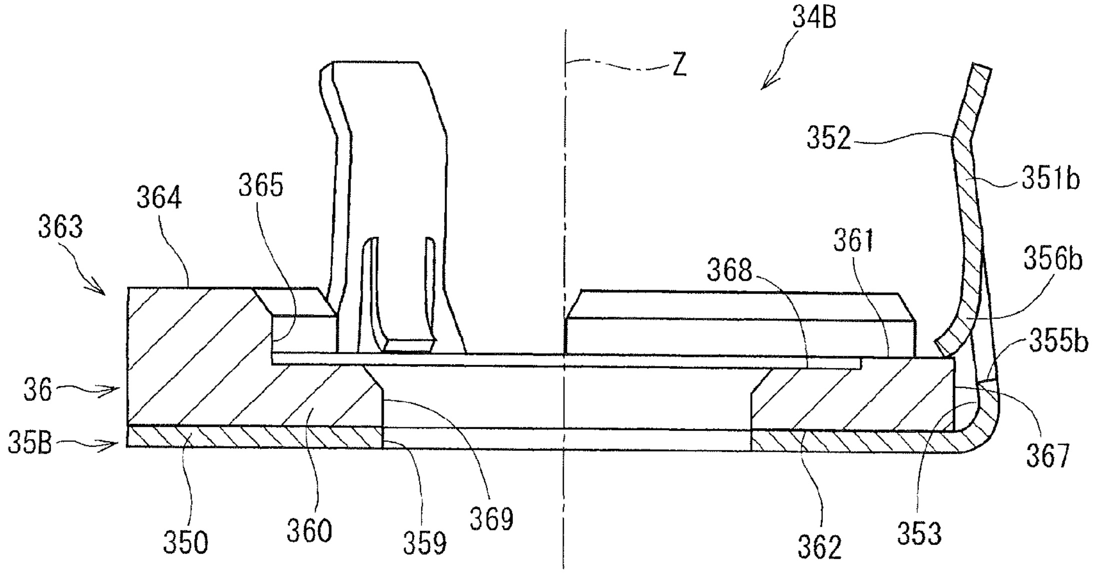
FIG. 9B is a cross-sectional view taken along line IXB-IXB in FIG. 9A.

With reference to FIGS. 9A and 9B, in a plunger stopper 34B of the second modification of the third embodiment, a window 355*b* is formed in each of three engaging portions 351*b* of a first ring 35B, and an auxiliary claw 356*b* is provided in the window 355*b* of the engaging portion 351*b*. The auxiliary claw 356*b* is bent obliquely downward from an upper end of the window 355*b* toward a radially inner side separately from a main claw of the engaging portion 351*b*, which forms the fit part 352. Each auxiliary claw 356*b* is urged against the upper surface 361 of the main body 360 of the second ring 36 to limit detachment of the second ring 36 from the first ring 35B.

Figure 10A:
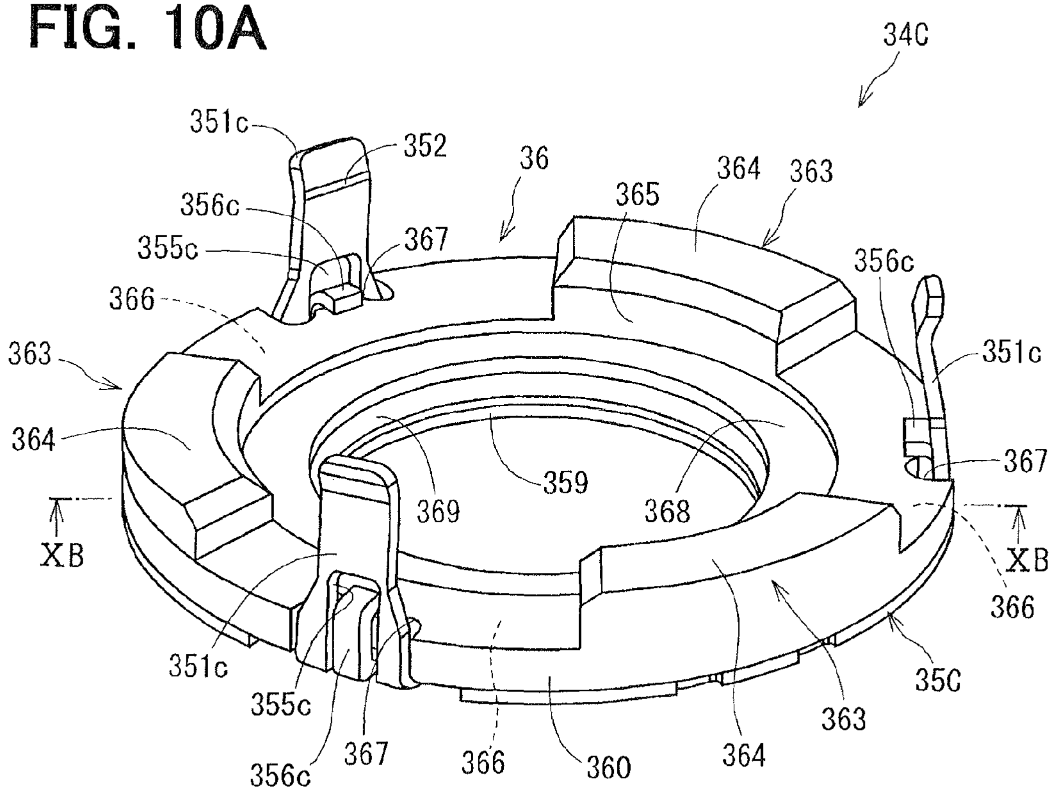
FIG. 10A is a perspective view of a plunger stopper in a third modification of the third embodiment.
Figure 10B:
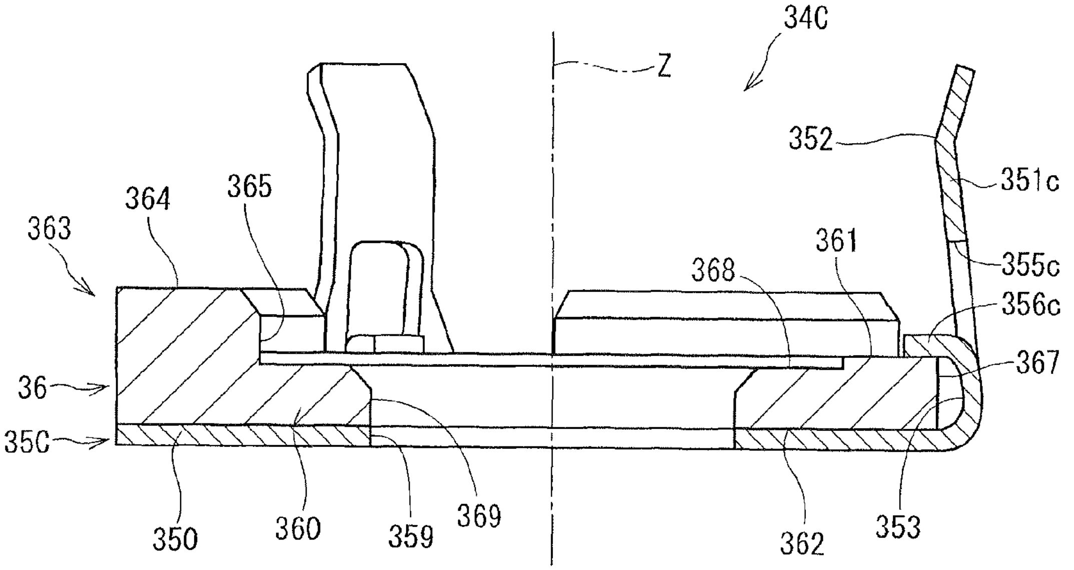
FIG. 10B is a cross-sectional view taken along line XB-XB in FIG. 10A.

With reference to FIGS. 10A and 10B, in a plunger stopper 34C of the third modification of the third embodiment, a window 355*c* is formed in each of three engaging portions 351*c* of a first ring 35C, and an auxiliary claw 356*c* is provided in the window 355*c* of the engaging portion 351*c*. Each auxiliary claw 356*c* is bent upward from the base 353 of the engaging portion 351*c* separately from a main claw of the engaging portion 351*c*, which forms the fit part 352, and a distal end part of the auxiliary claw 356*c* is further radially inwardly bent into a hook form. Each auxiliary claw 356*c* is urged against the upper surface 361 of the main body 360 of the second ring 36 to limit detachment of the second ring 36 from the first ring 35C.

Figure 11A:
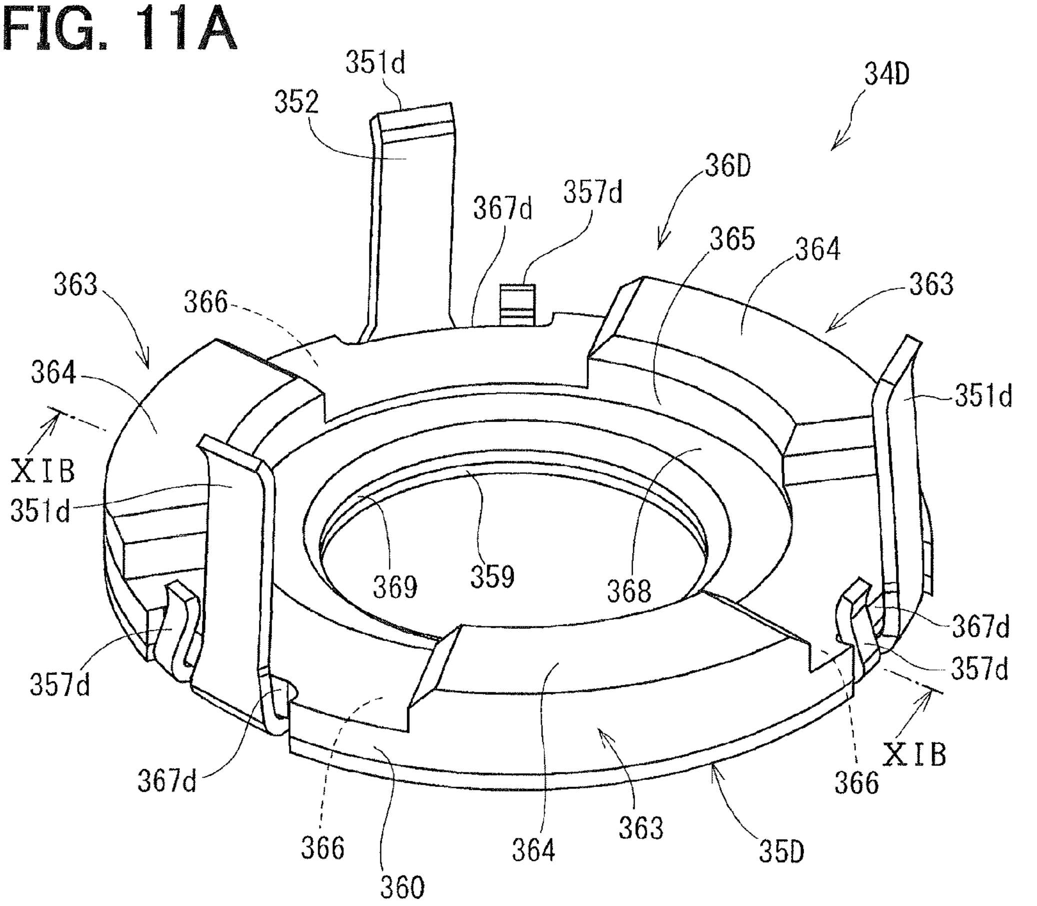
FIG. 11A is a perspective view of a plunger stopper in a fourth modification of the third embodiment.
Figure 11B:
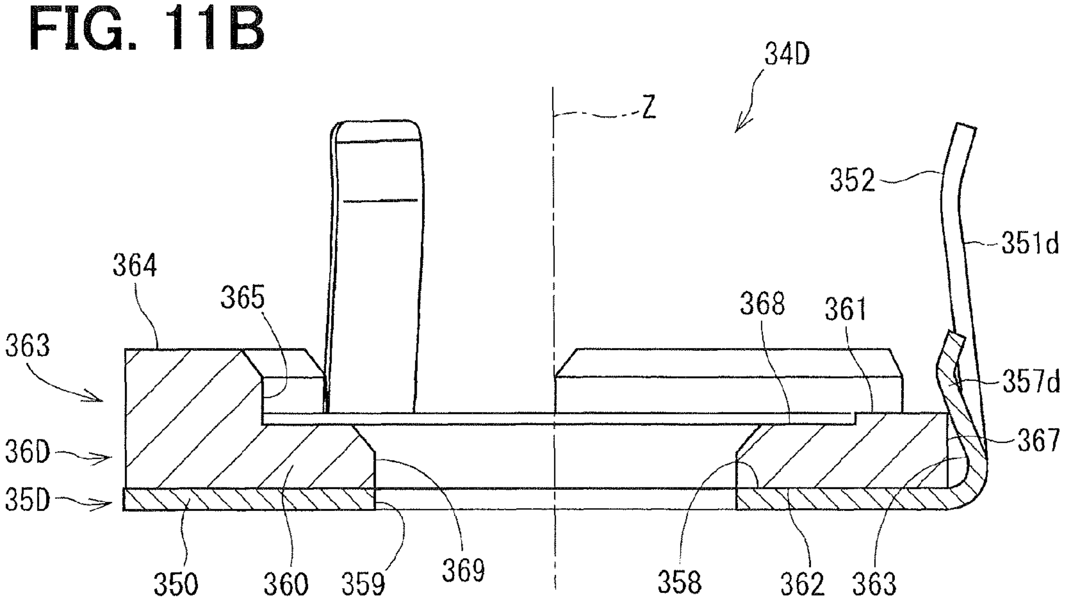
FIG. 11B is a cross-sectional view taken along line XIB-XIB in FIG. 11A.

Next, with reference to FIGS. 11A and 11B, in a plunger stopper 34D of the fourth modification of the third embodiment, three auxiliary claws 357*d* are formed such that each auxiliary claw 357*d* is placed adjacent to a corresponding one of three engaging portions 351*d* in a circumferential direction. The auxiliary claw 357*d* is bent upward from the base surface 358 of the main body 350. A second ring 36D is formed such that a circumferential extent of each of three radial recesses 367*d* is lengthened relative to a circumferential extent of the radial recess 367 of the second ring 36 of the third embodiment shown in FIGS. 6A to 7B, so that the corresponding engaging portion 351*d* and the corresponding auxiliary claw 357*d* are fitted into the radial recess 367*d*. Each auxiliary claw 357*d* radially inwardly exerts the resilient force and is thereby urged against the corresponding upper surface 361 or the corresponding radial recess 367*d* of the main body 360 of the second ring 36D and thereby to limit detachment of the second ring 36D from the first ring 35D.

Figure 12A:
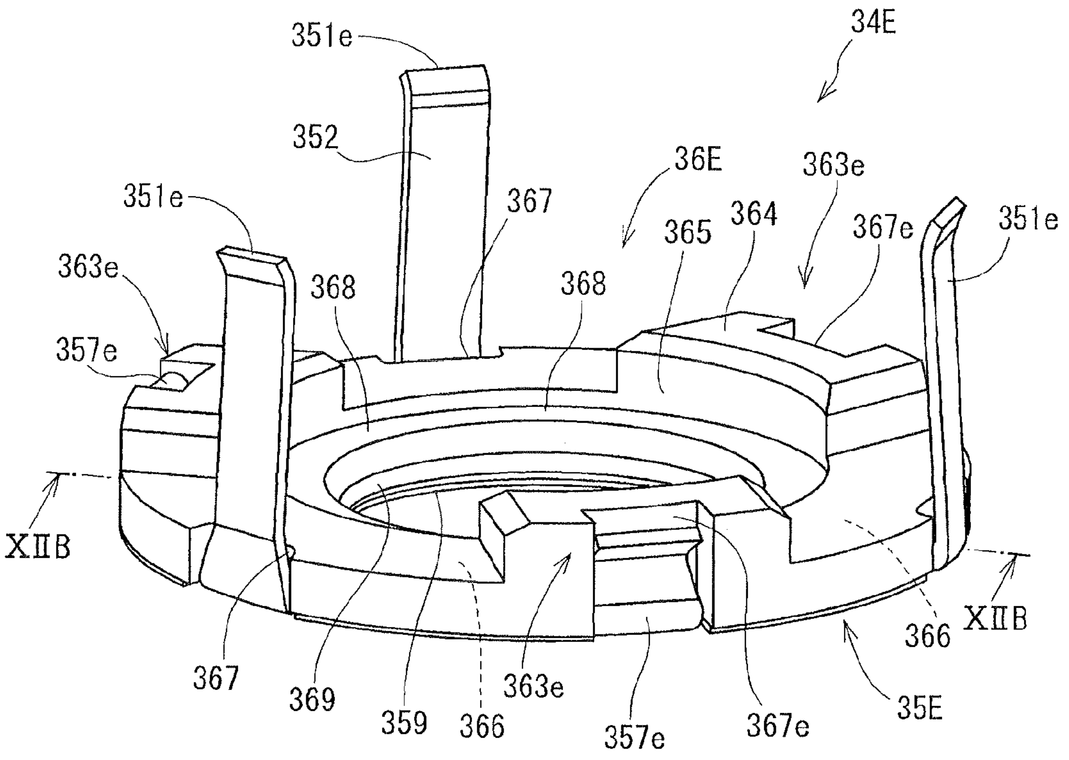
FIG. 12A is a perspective view of a plunger stopper in a fifth modification of the third embodiment.
Figure 12B:
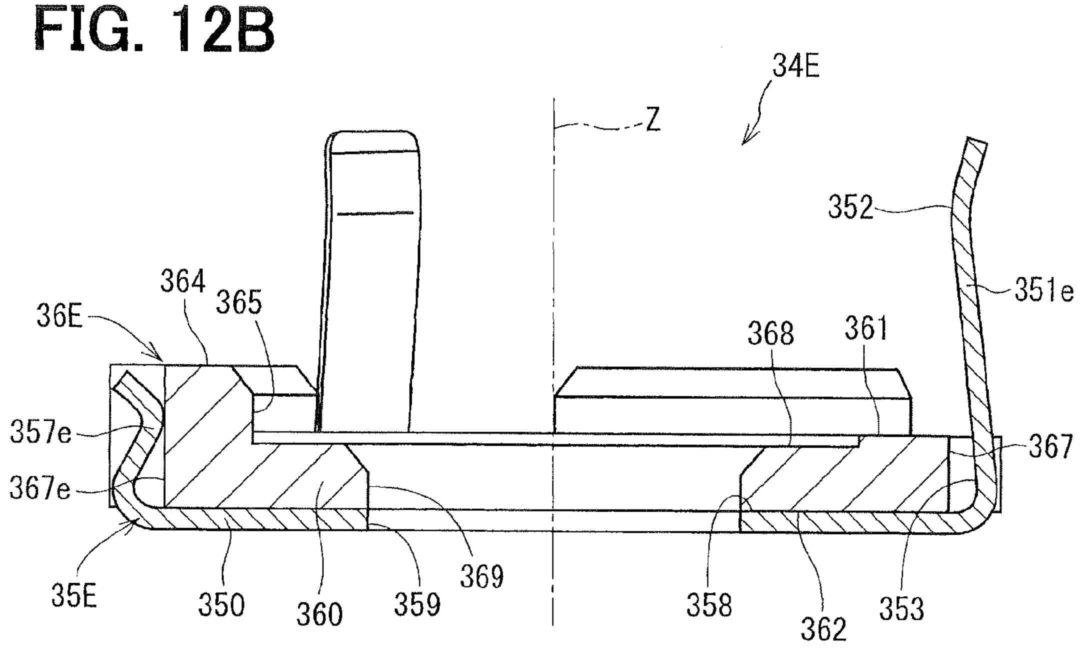
FIG. 12B is a cross-sectional view taken along line XIIB-XIIB in FIG. 12A.

Furthermore, with reference to FIGS. 12A and 12B, in a plunger stopper 34E of the fifth modification of the third embodiment, three auxiliary claws 357*e* are formed such that each auxiliary claw 357*e* is circumferentially placed between corresponding adjacent two of three engaging portions 351*e*. The auxiliary claw 357*e* is bent upward from the base surface 358 of the main body 350. Similar to the second ring 36 of the third embodiment shown in FIGS. 6A to 7B, a second ring 36E of the fifth modification includes the three radial recesses 367, into which the three engaging portions 351*e* are respectively fitted. In addition, the second ring 36E further includes three radial recesses 367*e*, which are formed in three protrusions 363*e*, respectively, to receive the three auxiliary claws 357*e*, respectively. Each auxiliary claw 357*e* radially inwardly exerts the resilient force and is thereby urged against an outer peripheral surface of the corresponding radial recess 367*e* of the second ring 36E and thereby to limit detachment of the second ring 36E from the first ring 35E.

(Fourth Embodiment)

Figure 13A:
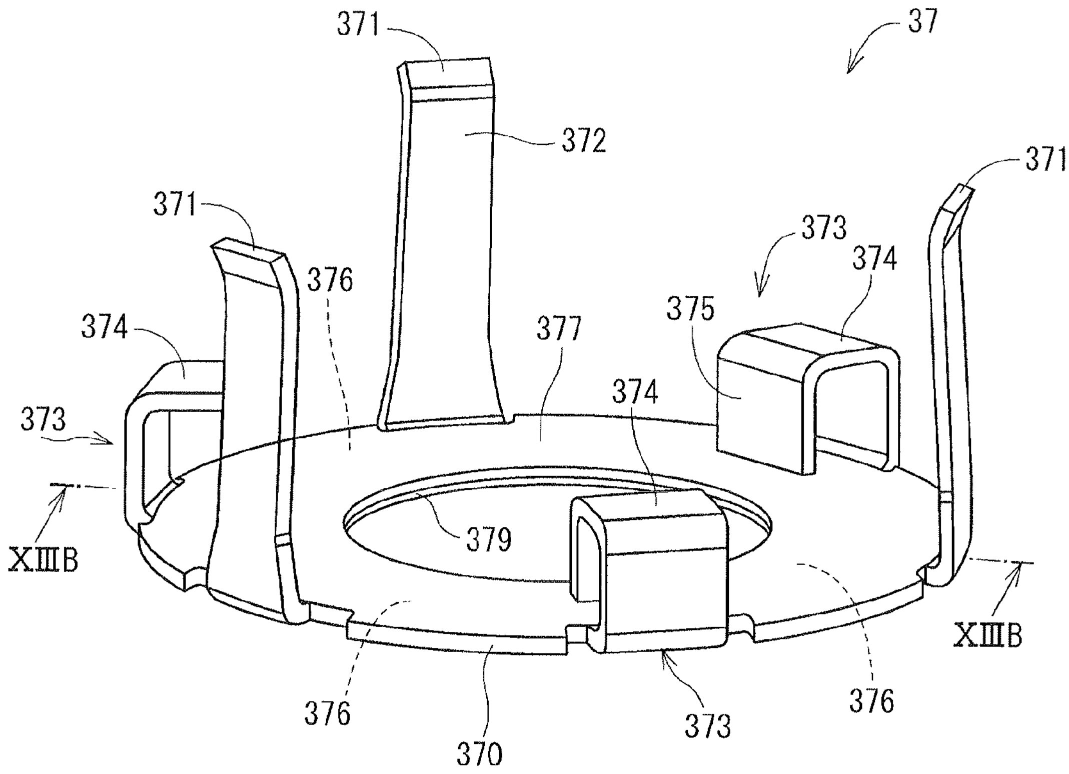
FIG. 13A is a perspective view of a plunger stopper according to a fourth embodiment of the present invention.
Figure 13B:
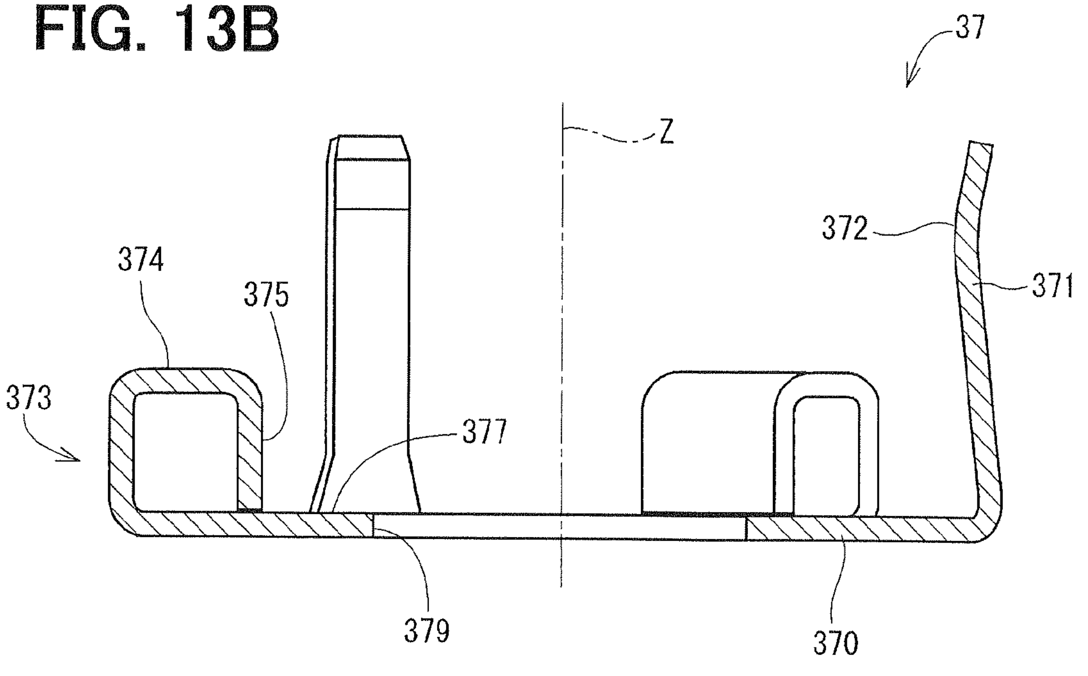
FIG. 13B is a cross-sectional view taken along line XIIIB-XIIIB in FIG. 13A.

FIGS. 13A and 13B show a plunger stopper according to a fourth embodiment of the present invention. Similar to the plunger stopper 34 of the third embodiment shown in FIGS. 6A to 7B, the plunger stopper 37 of the fourth embodiment includes the engaging portions 371, which radially inwardly exert the resilient force and are thereby urged against the outer peripheral wall surface 142 to hold the same without a need for forming the outer recess in the cylinder hole forming portion 14.

As shown in FIGS. 13A and 13B, the plunger stopper 37 of the fourth embodiment is formed as a single piece component through press working of a metal material (e.g., stainless steel).

The plunger stopper 37 is made from the relatively thin spring steel plate, which is similar to the thin spring steel plate that is used to form the first ring 35 of the third embodiment shown in FIGS. 6A to 7B. A receiving hole 379 extends through a center part of a main body 370 of the plunger stopper 37 to receive the small diameter portion 213 of the plunger 21 therethrough.

Furthermore, similar to the third embodiment, three engaging portions 371 are provided one after another along an outer peripheral edge part of the main body 370 at generally equal intervals in a circumferential direction. Also, each engaging portion 371 is bent in a direction (upward direction in FIGS. 13A and 13B), which is generally perpendicular to a base surface 377 of the main body 370. In addition, each engaging portion 371 has a fit part 372 at a radially inner surface of an upper end part of the engaging portion 371, and the fit part 372 contacts the outer peripheral wall surface 142 of the cylinder hole forming portion 14.

In the plunger stopper 37 of the fourth embodiment, three protrusions 373 are formed integrally with the main body 370 through a bending process, unlike the third embodiment. A height of an upper surface 374 of each protrusion 373, which is measured in the direction of the axis Z, is generally the same for all of the protrusions 373. When the upper surface 374 of each protrusion 373 contacts the cylinder end 141, the plunger stopper 37 is axially positioned relative to the cylinder hole forming portion 14.

A circumferential gap between each adjacent two of the protrusions 373 forms a communication passage 376. A height (depth) of the communication passage 376 corresponds to a difference between the base surface 377 of the main body 370 and the upper surface 374 of each protrusion 373.

In the fourth embodiment shown in FIGS. 13A and 13B, a portion of the base surface 377, which is located radially inward of an inner peripheral wall (radially inner wall) 375 of each protrusion 373, serves as a stopper portion.

In comparison to the third embodiment, in which the plunger stopper 34 is formed by assembling the two components (i.e. the first and second rings), it may not be advantageous with respect to the rigidity of the protrusions and the rigidity of the stopper portion in the fourth embodiment. However, according to the fourth embodiment, the plunger stopper 37 is formed by the single piece component, so that it is possible to reduce the number of components. Thereby, the manufacturing costs can be reduced.

Now, a modification of the fourth embodiment will be described.

Figure 14A:
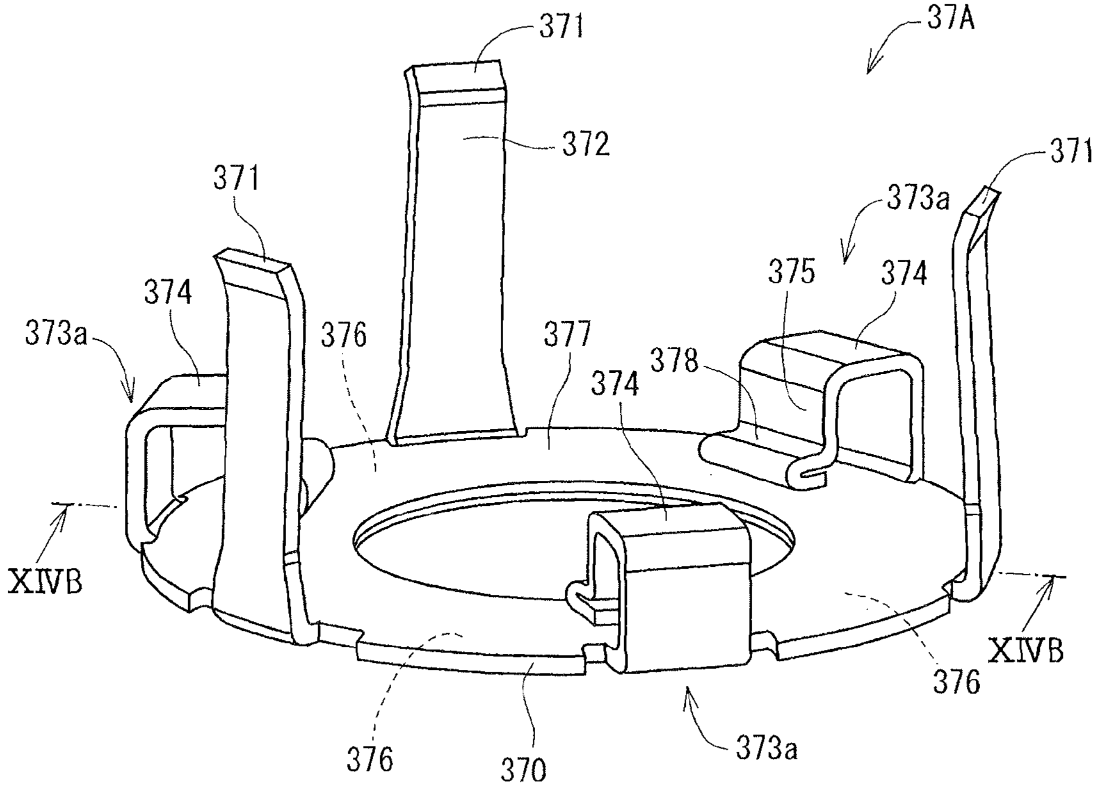
FIG. 14A is a perspective view of a plunger stopper in a modification of the fourth embodiment.
Figure 14B:
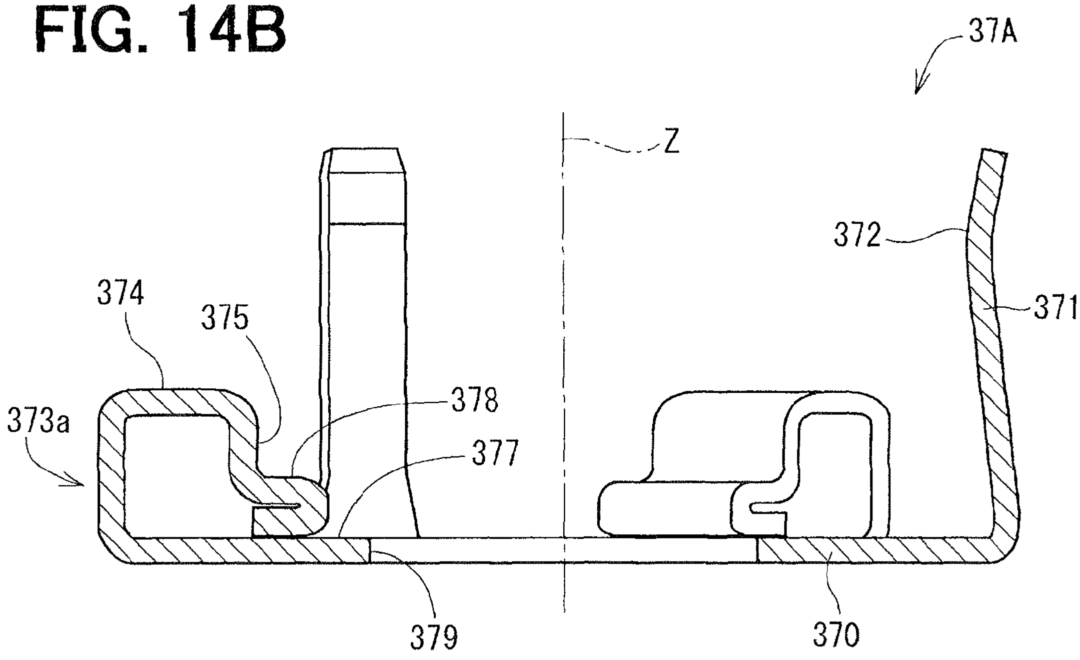
FIG. 14B is a cross-sectional view taken along line XIVB-XIVB in FIG. 14A.

A plunger stopper 37A of FIGS. 14A and 14B, which is the modification of the fourth embodiment, differs from the fourth embodiment shown in FIGS. 13A and 13B with respect to the structure of the respective protrusions 373*a*. Specifically, a stopper portion 378 is formed by further folding the inner peripheral wall (radially inner wall) 375 of the protrusion 373*a*, as shown in FIGS. 14A and 14B.

In this way, the rigidity of the stopper portion 378 of each protrusion 373*a* is improved in comparison to the stopper portion of the base surface 377 of the fourth embodiment shown in FIGS. 13A and 13B.

(Fifth Embodiment)

Figure 15:
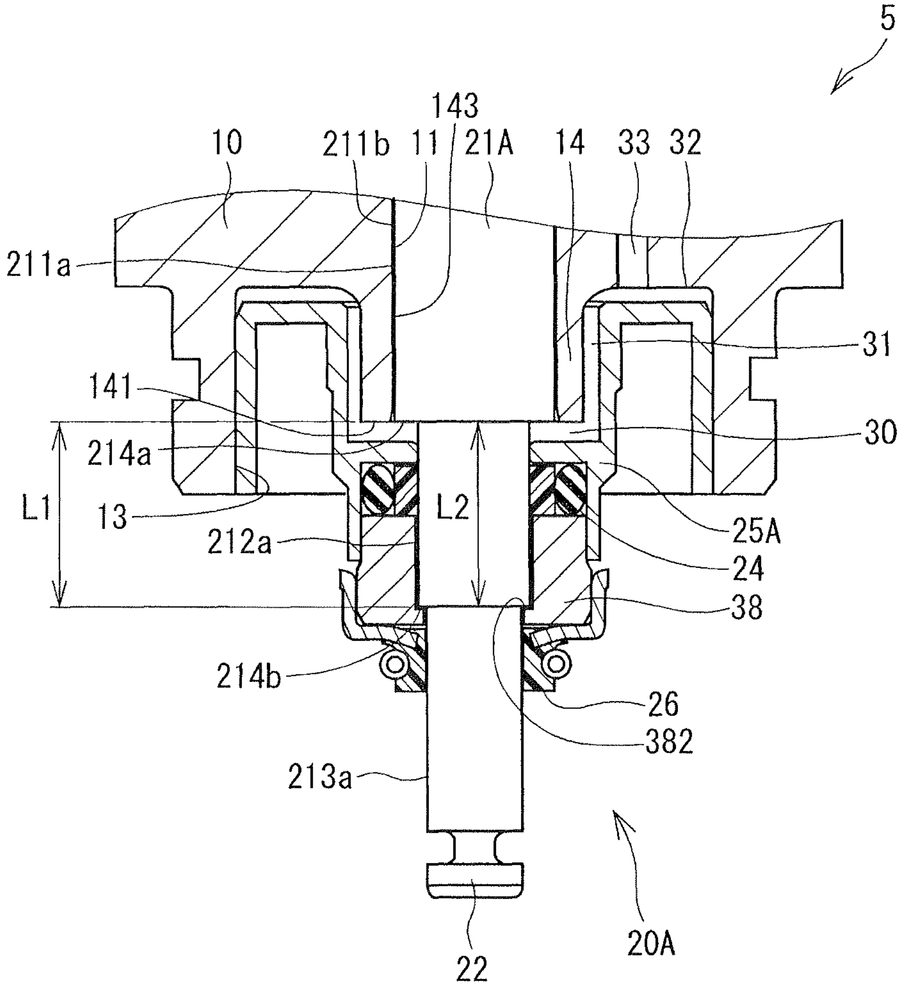
FIG. 15 is a partial cross-sectional view showing a state, in which a plunger stopper is installed to a plunger arrangement of a high pressure pump according to a fifth embodiment of the present invention.

FIG. 15 shows a high pressure pump 5 of a fifth embodiment of the present invention, in which a plunger stopper is installed to a plunger arrangement of the high pressure pump 5.

The plunger arrangement 20A of the high pressure pump 5 of the present embodiment will be described with referent to FIG. 15. The other remaining structure of the high pressure pump 5 of the present embodiment, which is other than the plunger arrangement 20A, is the same as that of the high pressure pump 1 of the first embodiment shown in FIG. 1 and thereby will not be described further.

The plunger arrangement 20A includes a plunger 21A, a plunger stopper 38, a fuel seal member 24, a seal element 25A, the plunger spring 28 and the variable volume chamber 30.

One end part of the plunger 21A is exposed to the pressurizing chamber 12. The plunger 21A includes a large diameter portion 211*a*, an intermediate diameter portion 212*a* and a small diameter portion 213*a*. The large diameter portion 211*a* slides along an inner peripheral wall of the cylinder hole 11. The intermediate diameter portion 212*a* extends from the large diameter portion 211*a* on an axial side, which is opposite from the pressurizing chamber 12. The intermediate diameter portion 212*a* has an outer diameter, which is smaller than the outer diameter of the large diameter portion 211*a*. The small diameter portion 213*a* extends from the intermediate diameter portion 212*a* on an axial side, which is opposite from the pressurizing chamber 12. The small diameter portion 213*a* has an outer diameter smaller than that of the intermediate diameter portion 212*a*. The large diameter portion 211*a*, the intermediate diameter portion 212*a* and the small diameter portion 213*a* are coaxial to each other. A first step portion 214*a* is formed at a boundary between the large diameter portion 211*a* and the intermediate diameter portion 212*a*. A second step portion 214*a* is formed at a boundary between the intermediate diameter portion 212*a* and the small diameter portion 213*a*.

The fuel seal member 24 is installed around the intermediate diameter portion 212*a* of the plunger 21A to limit leakage of fuel toward the engine upon reciprocation (slide movement) of the plunger 21A. The seal element 25A is installed around the small diameter portion 213*a*. The seal element 25A is configured into an annular form. A portion of the seal element 25A contacts a pressurizing chamber 12 side end portion of the fuel seal member 24 and an outer peripheral part of the fuel seal member 24. Another portion of the seal element 25A is fitted into the recess 13, which is formed in the pump body 10 and is configured into the annular form. This portion of the seal element 25A is fixed to the recess 13 by, for example, welding.

The plunger stopper 38, which is configured into an annular form, is provided around the intermediate diameter portion 212*a* and the small diameter portion 213*a* on an axial side of the fuel seal member 24, which is opposite from the pressurizing chamber 12. An end surface, which is opposed to the second step portion 214*b* of the plunger 21A, is formed in an inner wall surface of the plunger stopper 38, and this end surface serves as a stopper portion 382 against the second step portion 214*b* of the plunger 21A.

Here, a distance L1 between the stopper portion 382 of the plunger stopper 38 and the cylinder end 141 of the cylinder hole forming portion 14 is equal to an axial length L2 of the intermediate diameter portion 212*a* of the plunger 21A, i.e., the distance L2 between the first step portion 214*a* and the second step portion 214*b* of the plunger 21A.

Furthermore, an outer peripheral wall surface of the plunger stopper 38 is connected to the seal element 25A. Specifically, the plunger stopper 38 is fixed to the pump body 10 through the seal element 25A. Furthermore, an end portion of the plunger stopper 38, which is located on the pressurizing chamber 12 side, contacts an end portion of the fuel seal member 24, which is opposite from the pressurizing chamber 12. In this way, the plunger stopper 38 is integrated with the seal element 25A and functions as a holder, to which the fuel seal member 24 is fixed.

Next, advantages of the present embodiment will be described.

In the present embodiment, the plunger stopper 38 is fixed to the pump body 10 through the seal element 25A. Furthermore, the stopper portion 382 of the plunger stopper 38 is opposed to the second step portion 214*b*. In addition, the distance L1 between the stopper portion 382 of the plunger stopper 38 and the cylinder end 141 of the cylinder hole forming portion 14 is equal to the distance L2 between the first step portion 214*a* and the second step portion 214*b*, i.e., the axial length L2 of the intermediate diameter portion 212*a* of the plunger 21A.

Therefore, similar to the first embodiment, even when the second step portion 214*b* of the plunger 21A contacts the stopper portion 382 upon the movement of the plunger 21A in the cylinder hole 11, the slide surface 211*b* of the large diameter portion 211*a* entirely contacts the inner peripheral wall surface 143 of the cylinder hole 11 and does not project from the cylinder hole 11. Thereby, it is possible to limit the slide malfunction of the plunger 21A during the operation of the high pressure pump 5 in the protected state, in which the slide surface 211*b* of the plunger 21A is protected from the damage by hitting or the adhesion of a foreign object. Furthermore, it is possible to limit the falling off of the plunger 21A from the cylinder hole 11 at the process of assembling the high pressure pump 5 or at the process of installing the high pressure pump 5 to the engine.

Furthermore, since the fuel seal member 24 is interposed between the first step portion 214*a* of the plunger 21A and the stopper portion 382 of the plunger stopper 38, the stopper portion 382 is completely separated from a fuel containing region, such as the variable volume chamber 30. Thus, even when the small amount of debris is generated at the time of contacting the first step portion 214*a* of the plunger 21A against the stopper portion 382 of the plunger stopper 38, it is possible to limit intrusion of the generated debris between the slide surface 211*b* of the large diameter portion 211*a* and the inner peripheral wall surface 143 of the cylinder hole 11. Therefore, it is possible to limit the occurrence of the slide malfunction of the plunger 21A during the operation of the high pressure pump 5.

(Sixth Embodiment)

Figure 16:
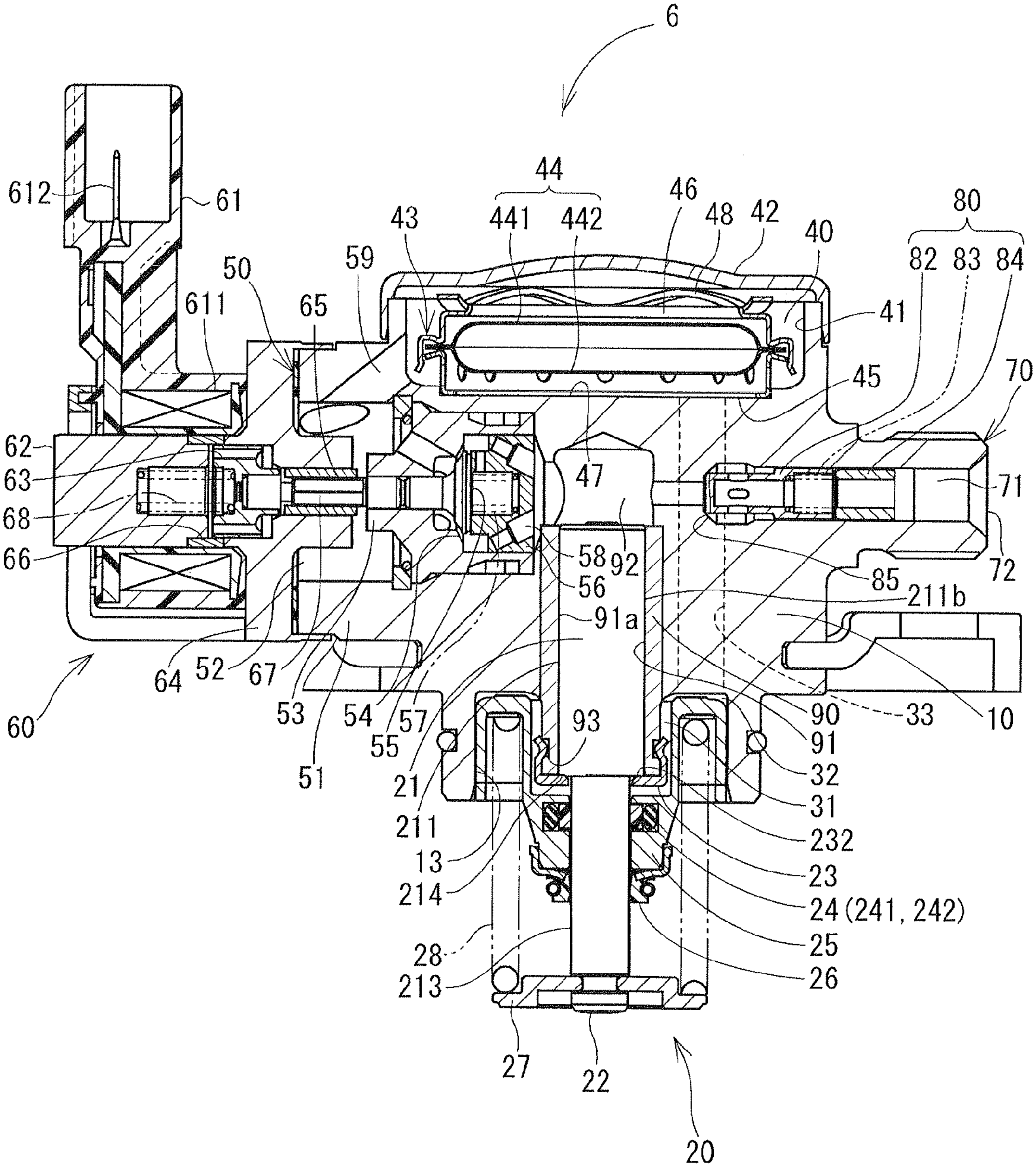
FIG. 16 is a schematic longitudinal cross-sectional view of a high pressure pump according to a sixth embodiment of the present invention.

FIG. 16 shows a high pressure pump according to a sixth embodiment of the present invention. The high pressure pump 6 of the present embodiment will be described with reference to FIG. 16.

The high pressure pump 6 is a high pressure pump of a separate cylinder type, in which the cylinder hole is made of a separate member, which is formed separately from the pump body 10. Specifically, although a cylinder forming member (also serving as a cylinder hole forming portion) 90 is connected to the pump body 10, the cylinder forming member 90 is a member, which is formed separately from the pump body 10. The cylinder forming member 90 includes a cylinder hole 91 and a pressurizing chamber 92, which are formed integrally in the cylinder forming member 90. The cylinder hole 91 is configured into a cylindrical form. The pressurizing chamber 92 is communicated with the cylinder hole 91.

An outer recess 93, which is configured into an annular form (annular groove) and extends in a circumferential direction, is formed in an outer peripheral wall surface of the cylinder forming member 90 at a location that is adjacent to an end (cylinder end) of the cylinder forming member 90, which is opposite from the pressurizing chamber 92. Similar to the first embodiment, the plunger stopper 23, which has substantially the same structure as that of the plunger stopper 23 of the first embodiment, is installed to the end of the cylinder forming member 90, which is opposite from the pressurizing chamber 92.

Specifically, the bent portion 234 of the plunger stopper 23 is detachably engaged to the outer recess 93 of the cylinder forming member 90 and is thereby fixed to the pump body 10. Furthermore, the stopper portion 232 of the plunger stopper 23 is opposed to the step portion 214 of the plunger 21 at the end of the cylinder forming member 90, which is opposite from the pressurizing chamber 92.

Therefore, similar to the first embodiment, even when the step portion 214 of the plunger 21 contacts the stopper portion 232 of the plunger stopper 23 upon the movement of the plunger 21 in the cylinder hole 91, the slide surface 211*b* of the large diameter portion 211 entirely contacts an inner peripheral wall surface 91*a* of the cylinder hole 91 and does not project from the cylinder hole 91. In this way, there is maintained the protected state, in which the slide surface 211*b* of the plunger 21 is protected from the damage by hitting or the adhesion of a foreign object.

Next, advantages of the present embodiment will be described.

In the first embodiment, the high pressure pump 1 has the pump body of the cylinder integrated type, in which the cylinder is integrally formed in the pump body. In contrast, the high pressure pump 6 of the present embodiment has the pump body of the separate cylinder type, in which the pump body 10 and the cylinder forming member 90 are formed separately. Furthermore, in the first embodiment, the outer recess 15 is formed in the wall surface of the cylinder hole forming portion 14 of the pump body 10. In contrast, in the present embodiment, the outer recess 93 is formed in the outer wall of the cylinder forming member 90.

Although the present embodiment differs from the first embodiment with respect to the above points, the position of the stopper portion 232 of the plunger stopper 23 in the axial direction of the cylinder hole 91 is the same as the position of the end of the cylinder forming member 90. Thereby, advantages, which are similar to those of the first embodiment, can be achieved. In other words, the plunger stopper 23 can be advantageously applied to both of the high pressure pump 1, which has the pump body of the cylinder integrated type, and the high pressure pump 6, which has the pump body of the separate cylinder type.

Now, further modifications of the above embodiments will be described.

In the first embodiment, the plunger stopper 23 is detachably installed to the cylinder hole forming portion 14 at the location adjacent to the cylinder end 141. However, it is not absolutely necessary to detachably install the plunger stopper 23 to the cylinder hole forming portion 14. For example, in the case where the plunger stopper 23 is securely connected or joined to the cylinder hole forming portion 14 at the location adjacent to the cylinder end 141, it is not necessary to form the outer recess 15 in the wall surface of the cylinder hole forming portion 14 and to form the bent portion 234 in the plunger stopper 23. That is, the outer peripheral wall surface of the cylinder hole forming portion 14 and the inner wall surface of the outer peripheral wall of the plunger stopper 23 may be securely connected or joined together by, for example, welding or press fit. This is also true for the sixth embodiment.

Furthermore, in the second embodiment, the string-shaped member (the C-shaped member) having the predetermined flexibility is used as the plunger stopper 23A. Alternatively, another member, such as an O-ring, may be used as the plunger stopper as long as it has the predetermined flexibility. Even in the case of the plunger stopper made of the O-ring, the engagement of such a plunger stopper to the inner recess 16, which is formed in the inner peripheral wall surface 143 of the cylinder hole forming portion 14, is easy, and the detachment of such a plunger stopper is possible.

Furthermore, in the third and fourth embodiments, the engaging portions 351, 371 of the plunger stopper 34, 37 exert the radially inward resilient force. Therefore, even though the outer recess is not formed in the outer peripheral wall surface 142 of the cylinder hole forming portion 14, the engaging portions 351, 371 of the plunger stopper 34, 37 can be urged and engaged to the outer peripheral wall surface 142 by this resilient force. However, if desired, the outer recess may be formed in the outer peripheral wall surface 142 of the cylinder hole forming portion 14, and the engaging portions of the plunger stopper may be engaged to the outer recess.

Furthermore, in the fifth embodiment, the distance L1 between the stopper portion 382 of the plunger stopper 38 and the cylinder end 141 of the cylinder hole forming portion 14 is equal to the distance L2 between the first step portion 214*a* and the second step portion 214*b* of the plunger 21A, i.e., the axial length L2 of the intermediate diameter portion 212*a* of the plunger 21A. Alternatively, the distance L1 may be made smaller than the length L2, if desired. Even with this modification, the advantages, which are similar to those discussed in the fifth embodiment, can be achieved. In such a case, the installation location of the plunger stopper 38 needs to be changed. However, this modification can be easily implemented by changing the shape of the plunger 21A.

Furthermore, in the sixth embodiment, the plunger stopper, which has substantially the same structure as that of the plunger stopper 23 of the first embodiment, is installed to the cylinder forming member 90, which is formed separately from the pump body 10. Alternatively, a plunger stopper, which has substantially the same structure as that of the plunger stopper 29, 34, 37, 38 of any of the second to fifth embodiments and modifications thereof, may be installed to the cylinder forming member 90, if desired.

Additional advantages and modifications will readily occur to those skilled in the art. The invention in its broader terms is therefore not limited to the specific details, representative apparatus, and illustrative examples shown and described. For instance, any one or more of any one of the above embodiments and modifications thereof may be combined with any one or more of another one of the above embodiments and modifications thereof within a scope and spirit of the present invention.

What is claimed is:

1. A high pressure pump comprising:
a cylinder forming member that includes:
a cylinder hole;
a pressurizing chamber, which is communicated with the cylinder hole; and
a cylinder hole forming portion, which is configured into a tubular form and in which the cylinder hole is formed, wherein the cylinder hole forming portion projects on a side opposite from the pressurizing chamber and has a cylinder end, which is opposite from the pressurizing chamber;
a plunger that includes:
a slide surface, which is slidable along an inner peripheral wall surface of the cylinder hole; and
a step portion, which is formed at a predetermined location of the plunger, wherein when the plunger is reciprocated in the cylinder hole in an axial direction of the cylinder hole, fuel is drawn into and pressurized in the pressurizing chamber; and
a plunger stopper that is installed to the cylinder hole forming portion of the cylinder forming member, wherein the plunger stopper cooperates with the step portion of the plunger to limit movement of the plunger in a state where the slide surface of the plunger contacts an inner peripheral wall surface of the cylinder hole, wherein:
the plunger includes:
a large diameter portion that has the slide surface and an end part, which is exposed in the pressurizing chamber; and
a small diameter portion that extends from the large diameter portion on a side opposite from the pressurizing chamber, wherein an outer diameter of the small diameter portion is smaller than an outer diameter of the large diameter portion;
the step portion forms a boundary between the large diameter portion and the small diameter portion; and
the plunger stopper includes a stopper portion, against which the step portion contacts upon movement of the plunger in the cylinder hole;
the plunger stopper is engaged to an outer peripheral wall surface of the cylinder hole forming portion of the cylinder forming member.

2. The high pressure pump according to claim 1, wherein the plunger stopper is detachably installed to the cylinder hole forming portion the cylinder forming member.

3. The high pressure pump according to claim 1, wherein the stopper portion of the plunger stopper is placed at one of:
a location, which is the same as a location of the cylinder end of the cylinder forming member in the axial direction of the cylinder hole; and
a location that is on a side of the cylinder end of the cylinder forming member, at which the pressurizing chamber is located, in the axial direction of the cylinder hole.

4. The high pressure pump according to claim 1, wherein:
an outer recess is formed in the outer peripheral wall surface of the cylinder hole forming portion of the cylinder forming member; and
the plunger stopper is engaged in the outer recess.

5. The high pressure pump according to claim 2, wherein the plunger stopper includes a plurality of engaging portions, which are engaged to the outer peripheral wall surface of the cylinder hole forming portion of the cylinder forming member.

6. The high pressure pump according to claim 5, wherein the plurality of engaging portions is urged by a radially inward resilient force thereof against the outer peripheral wall surface of the cylinder hole forming portion of the cylinder forming member.

7. The high pressure pump according to claim 5, wherein the plunger stopper includes at least one protrusion, which is circumferentially placed between corresponding adjacent two of the plurality of engaging portions and contacts the cylinder end of the cylinder forming member.

8. The high pressure pump according to claim 7, wherein:

the at least one protrusion includes a plurality of protrusions; and a communication passage is formed between each adjacent two of the plurality of protrusions to communicate between a radially inner area, which is located on a radially inner side of the plunger stopper, and a radially outer area, which is located on a radially outer side of the plunger stopper.

9. The high pressure pump according to claim 7, wherein the stopper portion is formed at a location, which is radially inward of an inner peripheral wall of the at least one protrusion.

10. The high pressure pump according to claim 7, wherein the plunger stopper includes:

a first ring that includes the plurality of engaging portions; and a second ring that includes the at least one protrusion and is formed separately from the first ring.

11. The high pressure pump according to claim 10, wherein:

the plurality of engaging portions of the first ring is formed to axially project from an outer peripheral edge part of a main body, which is configured into an annular form, toward the pressurizing chamber;

the second ring includes a plurality of radial recesses, which are circumferentially located to correspond with the plurality of engaging portions, respectively, and at least a portion of each of the plurality of engaging portions is adapted to be engaged with a corresponding one of the plurality of radial recesses; and the second ring is assembled to the first ring, so that the plurality of engaging portions is engaged to the plurality of radial recesses, respectively.

12. The high pressure pump according to claim 1, wherein the cylinder forming member is continuously and integrally formed with the pump body, which forms an outer contour of the high pressure pump.

13. The high pressure pump according to claim 1, further comprising a slidable member that is located on a side of the plunger stopper, which is opposite from the pressurizing chamber in the axial direction, wherein:

the slidable member slidably contacts the plunger; and the plunger stopper is installable to the outer peripheral wall surface of the cylinder hole forming portion separately from the slidable member.

* * * * *